US011972710B2

(12) United States Patent
Ito et al.

(10) Patent No.: US 11,972,710 B2
(45) Date of Patent: Apr. 30, 2024

(54) INFORMATION PROCESSING DEVICE AND CONTROL METHOD FOR FOLDABLE DISPLAYS

(71) Applicant: Lenovo (Singapore) Pte. Ltd., Singapore (SG)

(72) Inventors: Yoshinori Ito, Kanagawa (JP); Kyoko Kawamura, Kanagawa (JP); Noritoshi Yoshiyama, Kanagawa (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 53 days.

(21) Appl. No.: 17/879,161

(22) Filed: Aug. 2, 2022

(65) Prior Publication Data

US 2023/0070839 A1 Mar. 9, 2023

(30) Foreign Application Priority Data

Sep. 9, 2021 (JP) ................................ 2021-146747

(51) Int. Cl.
*G09G 3/00* (2006.01)

(52) U.S. Cl.
CPC ......... *G09G 3/035* (2020.08); *G09G 2320/08* (2013.01); *G09G 2340/0464* (2013.01); *G09G 2340/14* (2013.01); *G09G 2354/00* (2013.01)

(58) Field of Classification Search
CPC . G09G 3/035; G09G 2320/08; G09G 2340/14
See application file for complete search history.

(56) References Cited

U.S. PATENT DOCUMENTS

2012/0249445 A1* 10/2012 Suzuki .................. G06F 3/0485 345/173
2013/0139074 A1* 5/2013 Ozaki .................. G06F 1/1618 715/761

(Continued)

FOREIGN PATENT DOCUMENTS

JP H10-254674 A 9/1998
JP 2011-118660 A 6/2011
JP 2018-013850 A 1/2018

OTHER PUBLICATIONS

New functions such as virtual desktops: NikkeiPC21, Japan, Nikkei Business Publications, Inc., Nov. 24, 2014, 20 (1), pp. 24-29 (8 pages).

*Primary Examiner* — Terrell M Robinson
(74) *Attorney, Agent, or Firm* — Osha Bergman Watanabe & Burton LLP

(57) ABSTRACT

An information processing device includes: a foldable one display; a memory which stores at least a program; and a processor. By executing the program stored in the memory, the processor performs display mode switching processing to switch among a first display mode to control display in such a manner that a screen area of the display is set as one display area, a second display mode to control display in such a manner that the screen area of the display is split into two display areas of a first display area and a second display area with the first display area set as a primary screen and the second display area set as a secondary screen, and a third display mode to control display in such a manner that the second display area is set as the primary screen and the first display area is set as the secondary screen.

6 Claims, 13 Drawing Sheets

(56) References Cited

U.S. PATENT DOCUMENTS

| | | | | |
|---|---|---|---|---|
| 2013/0145308 | A1* | 6/2013 | Tsuruoka | G06F 3/1446 715/781 |
| 2013/0271378 | A1* | 10/2013 | Hulford | G06F 1/1643 345/168 |
| 2021/0150953 | A1 | 5/2021 | Lee et al. | |
| 2022/0083148 | A1* | 3/2022 | Chen | G06F 3/017 |

* cited by examiner

INFORMATION PROCESSING DEVICE AND CONTROL METHOD FOR FOLDABLE DISPLAYS

CROSS-REFERENCE TO RELATED APPLICATIONS

This application claims priority to Japanese Patent Application No. 2021-146747 filed on Sep. 9, 2021, the contents of which are hereby incorporated herein by reference in their entirety.

TECHNICAL FIELD

The present invention relates to an information processing device and a control method.

BACKGROUND

In recent years, there has been an information processing device in which a foldable flexible display (display unit) is provided (for example, see Japanese Unexamined Patent Application Publication No. 2018-13850). For example, the information processing device is so configured that one display is provided over foldable first chassis and second chassis through a coupling unit (hinge mechanism), and the display is also bent according to the bending of the first chassis and the second chassis. When one display is provided over the first chassis and the second chassis in this way, the one display can not only be used as one screen but also as a pseudo two-screen structure in which the one display is split into a display area on the first chassis side and a display area on the second chassis side.

However, when the foldable one display is used as the two-screen structure, a display on each screen may not be suitable because respective screens are not independent displays. For example, when two screens are independent of each other, display control of each screen for each display is possible, while when two screens are provided by splitting one display into two display areas, display control may not be able to be performed properly by display control in a unit of the display (two screens together).

SUMMARY

One or more embodiments of the present invention provide an information processing device and a control method to control display on a foldable display properly.

One or more embodiments of the present invention is an information processing device that includes: a foldable one display; a memory which stores at least a program; and a processor which executes the program stored in the memory, wherein, by executing the program stored in the memory, the processor performs display mode switching processing to switch among a first display mode to control display in such a manner that a screen area of the display is set as one display area, a second display mode to control display in such a manner that the screen area of the display is split into two display areas of a first display area and a second display area with the first display area set as a primary screen and the second display area set as a secondary screen, and a third display mode to control display in such a manner that the second display area is set as the primary screen and the first display area is set as the secondary screen, and the processor performs display control processing in which when switching from the first display mode to the second display mode or the third display mode is performed by the display mode switching processing, an active window in the first display mode is displayed in either one of the first display area and the second display area, which is a display area as the primary screen, and thumbnail images corresponding to inactive windows other than the active window in the first display mode are displayed in the other display area of the first display area and the second display area, which is set as the secondary screen, and when switching between the second display mode and the third display mode is performed by the display mode switching processing, display in a display area as the secondary screen in the display mode before switching is changed to display in a display area as the secondary screen in the display mode after switching.

The above information processing device may also be such that, in a case where switching between the second display mode and the third display mode is performed by the display mode switching processing, when the thumbnail images are displayed in the display area as the secondary screen in the display mode before switching, the processor displays the thumbnail images in the display area as the secondary screen in the display mode after switching by the display control processing.

The above information processing device may further be such that, in a case where switching between the second display mode and the third display mode is performed by the display mode switching processing, when an active window selected from the thumbnail images is displayed in the display area as the secondary screen in the display mode before switching, the processor displays the active window in the display area as the secondary screen in the display mode after switching by the display control processing.

Further, the above information processing device may be such that when switching between the second display mode and the third display mode is performed by the display mode switching processing, the processor displays the active window, displayed in a display area as the primary screen in the display mode before switching, in a display area as the primary screen in the display mode after switching by the display control processing.

Further, the above information processing device may be such that, in a case where the number of running apps is two, when switching from the first display mode to the second display mode or the third display mode is performed by the display mode switching processing, the processor displays the active window in the first display mode in either one of the first display area and the second display area, which is a display area as the primary screen, and an inactive window other than the active window in the first display mode in the other display area of the first display area and the second display area, which is set as the secondary screen.

Further, a control method for an information processing device according to one or more embodiments of the present invention is a control method for an information processing device including: a foldable one display; a memory which stores at least a program; and a processor which executes the program stored in the memory, the control method including, by the processor executing the program stored in the memory: a step of switching among a first display mode to control display in such a manner that a screen area of the display is set as one display area, a second display mode to control display in such a manner that the screen area of the display is split into two display areas of a first display area and a second display area with the first display area set as a primary screen and the second display area set as a secondary screen, and a third display mode to control display in such a manner that the second display area is set as the primary screen and the first display area is set as the secondary screen; a step in which when switching from the first display mode to the second display mode or the third display mode is performed, an active window in the first display mode is displayed in either one of the first display area and the second display area, which is a display area as the primary screen, and thumbnail images corresponding to inactive windows other than the active window in the first display mode are displayed in the other display area of the first display area and the second display area, which is set as the secondary screen; and a step in which when switching between the second display mode and the third display mode is performed, display in a display area as the secondary screen in the display mode before switching is changed to display in a display area as the secondary screen in the display mode after switching.

One or more embodiments of the present invention can control display on a foldable display properly.

DETAILED DESCRIPTION

Embodiments of the present invention will be described below with reference to the accompanying drawings.

First, an overview of one or more embodiments of the present invention will be described.

Figure 1:
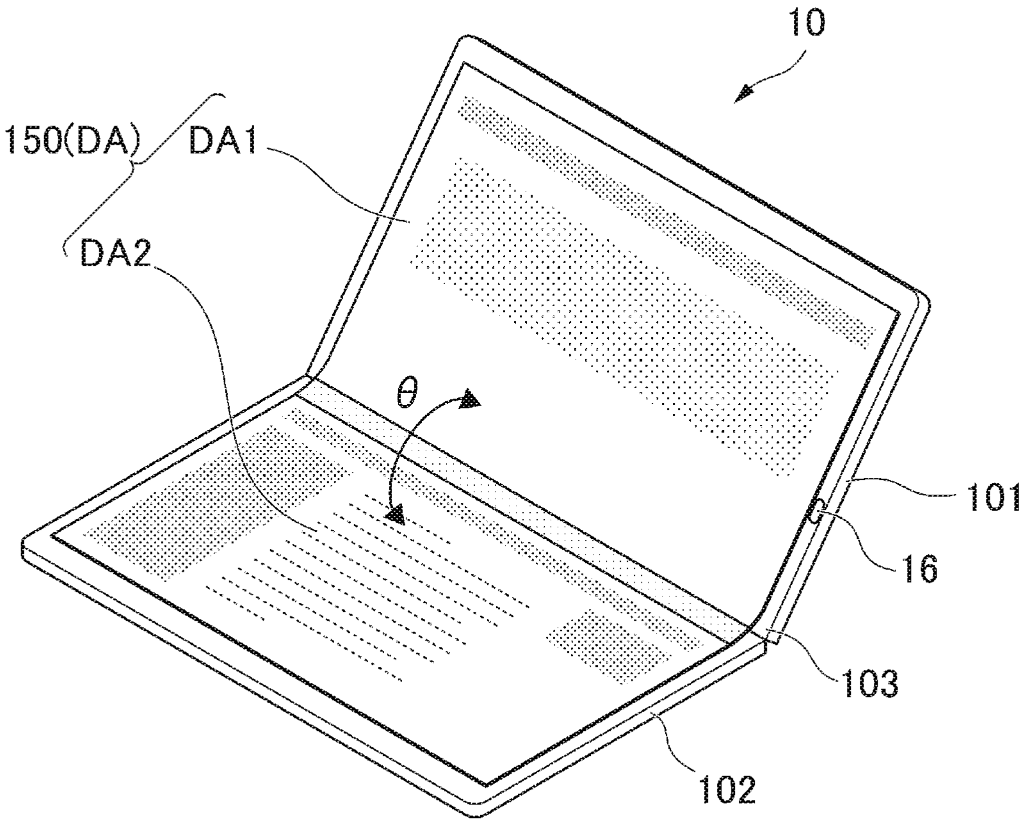
FIG. 1 is a perspective view illustrating the appearance of an information processing device according to one or more embodiments.

FIG. 1 is a perspective view illustrating the appearance of an information processing device 10 according to one or more embodiments of the present embodiment. The information processing device 10 according to one or more embodiments is a clamshell (laptop) PC (Personal Computer). The information processing device 10 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the axis of rotation of the hinge mechanism 103. A state where an open angle θ between the first chassis 101 and the second chassis 102 around the axis of rotation is substantially 0° is a state where the first chassis 101 and the second chassis 102 are closed in such a manner as to overlap each other. The state where the first chassis 101 and the second chassis 102 are closed is called a "closed state" (closed). Surfaces of the first chassis 101 and the second chassis 102 on the sides to face each other in the closed state are called "inner surfaces," and surfaces on the other sides of the inner surfaces are called "outer surfaces," respectively. The open angle θ can also be called an angle between the inner surface of the first chassis 101 and the inner surface of the second chassis 102. As opposed to the closed state, a state where the first chassis 101 and the second chassis 102 are open is called an "open state." The open state is a state where the first chassis 101 and the second chassis 102 are rotated relative to each other until the open angle θ exceeds a preset threshold value (for example, 10°).

Further, the information processing device 10 includes a camera 16 and a display 150. The camera 16 is provided on the inner surface of the first chassis 101. The display 150 is provided over the inner surface of the first chassis 101 and the inner surface of the second chassis 102. For example, the camera 16 is provided in an outer part of a screen area of the display 150 on the first chassis 101 to be able to capture a user or the like present on the side facing the display 150. The display 150 is a flexible display flexible according to the open angle θ by the relative rotation between the first chassis 101 and the second chassis 102 (see FIG. 3 and FIG. 4). As the flexible display, an organic EL display or the like is used. The information processing device 10 can control not only display as a one-screen structure in the entire screen area as one display area DA of the display 150, but also display as a two-screen structure by splitting the screen area of the display 150 into two display areas as a first display area DA1 and a second display area DA2. Here, the first display area DA1 and the second display area DA2 are display areas that do not overlap each other. It is here assumed that a display area corresponding to the inner surface side of the first chassis 101 in the screen area of the display 150 is the first display area DA1, and a display area corresponding to the inner surface side of the second chassis 102 is the second display area DA2.

Note that a touch sensor is provided on the screen area of the display unit 150. The information processing device 10 can detect touch operations to the screen area of the display 150. By putting the information processing device 10 into the open state, a user can visually confirm the display of the display 150 provided on the respective inner surfaces of the first chassis 101 and the second chassis 102, and perform touch operations to the display 150, thus enabling use of the information processing device 10.

Further, when the information processing device 10 makes a transition from the display of the one-screen structure to the display of the two-screen structure, an active window among windows of currently running applications is displayed on a primary screen of the two screens, and thumbnail images of inactive windows are displayed on a secondary screen. In the following, an operating mode for the display in the one-screen structure is called a "one-screen mode," and an operating mode for the display in the two-screen structure is called a "two-screen mode." The active window is a window being currently selected as a user operation target, which is being displayed in the foreground of the display 150. The active window to be displayed on the primary screen is a window displayed as the active window in the one-screen mode immediately before the transition to the two-screen mode. On the other hand, the inactive windows are windows other than the active window in the one-screen mode immediately before the transition to the two-screen mode. In the following, a window in which thumbnail images of inactive windows are displayed is also called a "thumbnail window."

Figure 2:
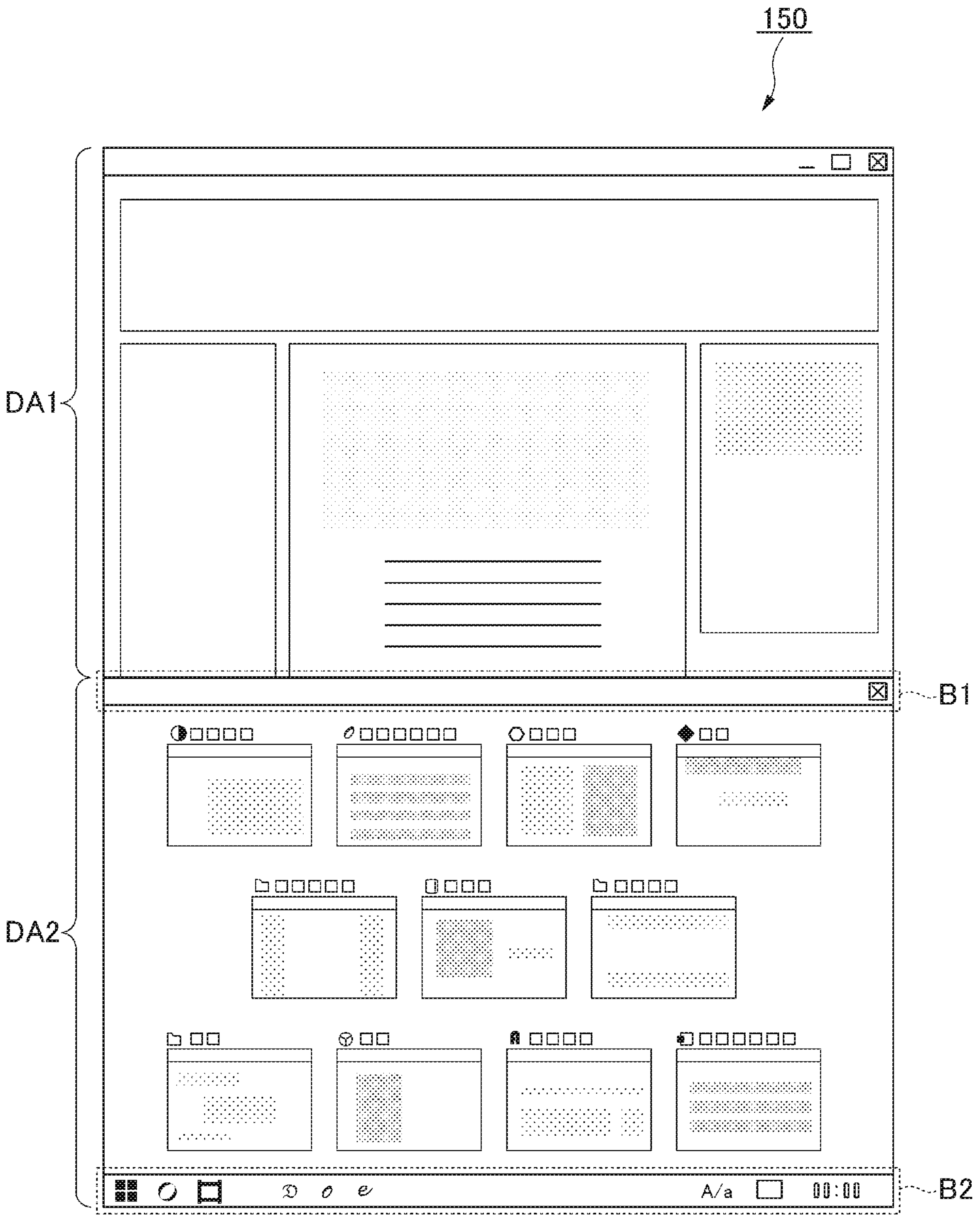
FIG. 2 is a diagram illustrating an example of a thumbnail window according to one or more embodiments.

FIG. 2 is a diagram illustrating an example of the thumbnail window according to one or more embodiments. This figure illustrates an example of the thumbnail window when the information processing device 10 illustrated in FIG. 1 makes the transition from the one-screen mode to the two-screen mode. In a usage form of a clamshell PC in a typical two-screen mode, the first display area DA1 and the second display area DA2 are lined up and down vertically in landscape orientation. The landscape orientation of the display areas means an orientation where the long sides of the four sides of each rectangular display area are in a lateral direction and the short sides are in a longitudinal direction. The longitudinal direction corresponds to the vertical (up and down) direction, and the lateral direction corresponds to the horizontal (right and left) direction. The vertical direction is typically a perpendicular direction. In other words, the first display area DA1 and the second display area DA2 are so arranged that a lower-side edge in the display orientation of the first display area DA1 comes to the side of an upper-side edge in the display orientation of the second display area DA2. Here, the first display area DA1 corresponds to the primary screen and the second display area DA2 corresponds to the secondary screen. However, it is also possible to set the second display area DA2 as the primary screen and the first display area DA1 as the secondary screen. Further, it is possible to switch the selection as to which area is set to the primary screen based on a device state obtained from user operations or values read from various sensors, a usage history, and the like. Switching between these display modes will be described in detail later.

Upon transition from the one-screen mode to the two-screen mode, the information processing device 10 displays, in the first display area DA1 (primary screen), an active window of an application (hereinafter simply called an "app") running in the one-screen mode. For example, upon transition to the two-screen mode, the information processing device 10 displays the active window, which was displayed in the display area DA in the one-screen mode, in the foreground as the active window over the entire display area of the first display area DA1 (full-screen display). Further, upon transition to the two-screen mode, the information processing device 10 adapts a window as an inactive window in the one-screen mode to a layer behind the foreground in which the active window of the first display area DA1 is displayed in such a state as to maintain a layer relationship (the stacking order of windows) in the one-screen mode. Thus, the full-screen display of the active window is provided in the first display area DA1, and the inactive window is not displayed (cannot be viewed by the user) though it exists in the layer behind the active window.

Further, upon transition from the one-screen mode to the two-screen mode, the information processing device 10 generates a thumbnail image of a window that was the inactive window in the one-screen mode, and displays a thumbnail window in the second display area DA2. When there are two or more inactive windows, the information processing device 10 displays, in the second display area DA2, a thumbnail window in which thumbnail images of the two or more inactive windows are lined up. When any one of the thumbnail images is selected with a user operation (for example, a tap operation), the information processing device 10 closes (hides) all the thumbnail images displayed in the second display area DA2, and displays an inactive window corresponding to the selected thumbnail image in the second display area DA2 as an active window. Specifically, as an example, the information processing device 10 moves the inactive window corresponding to the selected thumbnail image from the first display area DA1 to the second display area DA2, and displays, in maximized form, the inactive window as an active window in the second display area DA2 (provides the full-screen display inside the second display area DA2).

Note that in this thumbnail window, reduced images of one or more windows are displayed side by side in the second display area DA2 (secondary screen) as thumbnails. A title bar B1 is displayed on the upper edge of the thumbnail window. A close button "x" at the right end of the title bar B1 is displayed as an operator used to close the thumbnail window. The user can also close (hide) all the thumbnail images by operating the close button "x" on this title bar B1 (for example, with a tap operation).

Note that inactive windows existing in layers behind the active window in the first display area DA1 (that is, real forms of inactive windows (real windows) displayed as thumbnails in the second display area DA2) may be stacked one above the other in the same size according to the priority in such a manner to be hidden behind the active window, or may be stacked one above the other according to the priority in a size smaller than the active window. Further, all inactive windows existing in layers behind the active window in the first display area DA1 (that is, real forms of inactive windows (real windows) displayed as thumbnails in the second display area DA2) may be once miniaturized (for example, in a state where only icons exist on a task bar in Windows (registered trademark)), or when the thumbnail window is not displayed as a semi-transparent (see-through) display, it does not matter if the inactive windows are stacked behind the active window. In short, it is only necessary to process the real forms of the inactive windows (real windows) displayed as thumbnails in the second display area DA2 in a manner not to be viewed temporarily by the user. After that, in the second display area DA2, only a window of a thumbnail image of an app selected in the thumbnail window is displayed as an active window in the foreground.

Further, a task bar B2 displayed on the lower edge of the second display area DA2 is displayed in one place as a task bar common to the first display area DA1 and the second display area DA2. Note that the position of displaying the task bar B2 may also be the left edge or the right edge of the first display area DA1 or the second display area DA2, or the upper edge of the first display area DA1. Further, task bars may be displayed in both the first display area DA1 and the second display area DA2, respectively. The application of embodiments of the present invention is not limited by the position where the task bar is displayed.

Thus, upon transition from the one-screen mode to the two-screen mode, the active window, which was displayed in the display area DA in the one-screen mode, is displayed in the first display area DA1 (primary screen), and the thumbnail images of windows that were inactive windows in the one-screen mode are displayed in the second display area DA2 (secondary screen). Further, when any one of the thumbnail images displayed in the second display area DA2 is selected, an inactive window corresponding to the selected thumbnail image is displayed in the second display area DA2 as an active window. In other words, display states of the second display area DA2 include a state where the thumbnail window is displayed and a state where any one of windows of running apps is displayed.

Next, usage forms and screen modes of the information processing device 10 will be described in detail. First, the usage forms of the information processing device 10 are divided into a state in which the first chassis 101 and the second chassis 102 are bent (Bent form) at an open angle θ between the first chassis 101 and the second chassis 102, and a flat state (Flat form) in which the first chassis 101 and the second chassis 102 are not bent. In the following, the state where the first chassis 101 and the second chassis 102 are bent (Bent form) is simply called the "bent state (Bent form)," and the flat state (Flat form) in which the first chassis 101 and the second chassis 102 are not bent is simply called the "flat state (Flat form)." In the bent state (Bent form), the display 150 provided over the first chassis 101 and the second chassis 102 is also in the bent state. In the flat state (Flat form), the display 150 is also in the flat state.

Figure 3:
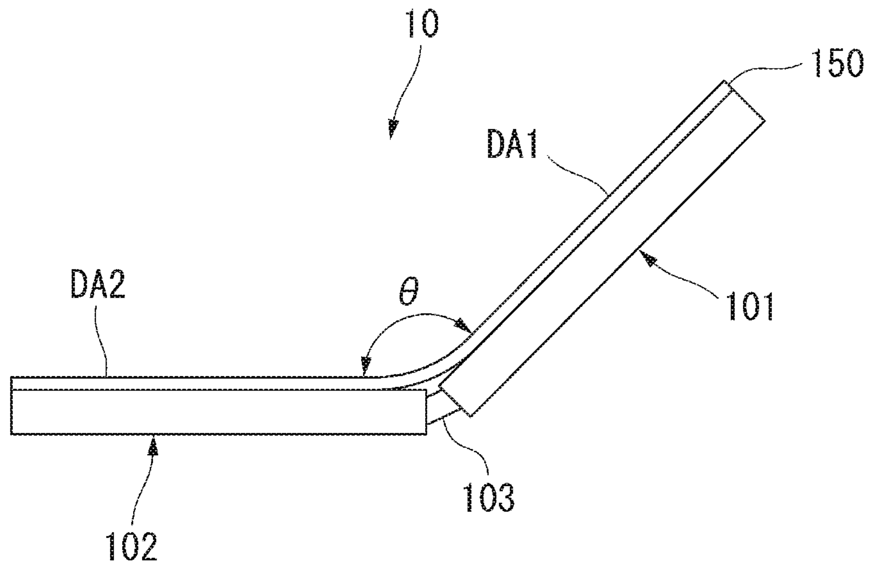
FIG. 3 is a side view illustrating an example of the information processing device in a bent state according to one or more embodiments.

FIG. 3 is a side view illustrating an example of the information processing device 10 in the bent state (Bent form). The display 150 is arranged over (across) the first chassis 101 and the second chassis 102. The screen area of the display 150 (the display area DA illustrated in FIG. 1) can be bent by using a part corresponding to the hinge mechanism 103 as a crease, and on the border of the crease, a display area on the side of the first chassis 101 is the first display area DA1 and a display area on the side of the second chassis 102 is the second display area DA2. The display 150 is bent according to the rotation (open angle θ) between the first chassis 101 and the second chassis 102. The information processing device 10 determines whether or not the state is the bent state (Bent form) depending on the open angle θ. As an example, in the case of $10° < \theta < 170°$, the information processing device 10 determines the bent state (Bent form). This state corresponds to a usage form as a so-called clamshell mode or book mode.

Figure 4:
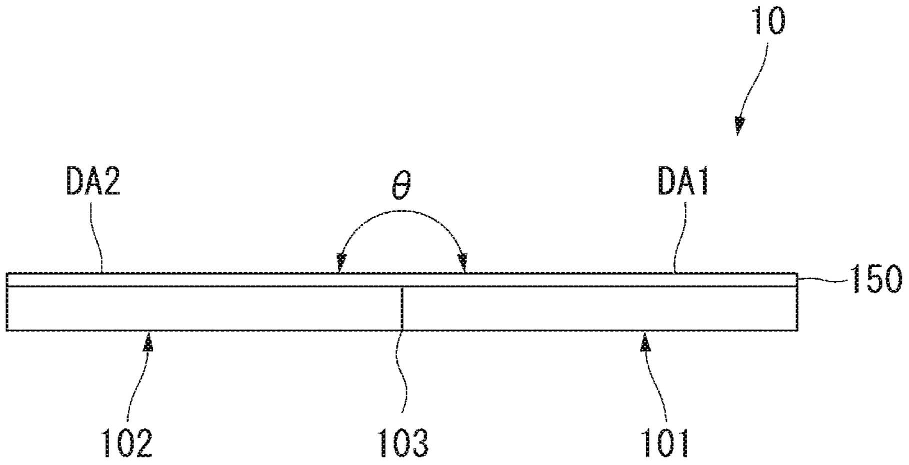
FIG. 4 is a side view illustrating the information processing device in a flat state according to one or more embodiments.

FIG. 4 is a side view illustrating an example of the information processing device 10 in the flat state (Flat form). The information processing device 10 typically determines the flat state (Flat form) when the open angle θ is 180°, but as an example, the information processing device 10 may also determine the flat state (Flat form) in the case of $170° \leq \theta \leq 180°$. For example, when the open angle θ between the first chassis 101 and the second chassis 102 is 180°, the display 150 is also in the flat state. This state corresponds to a usage form as a so-called tablet mode.

Figure 5:
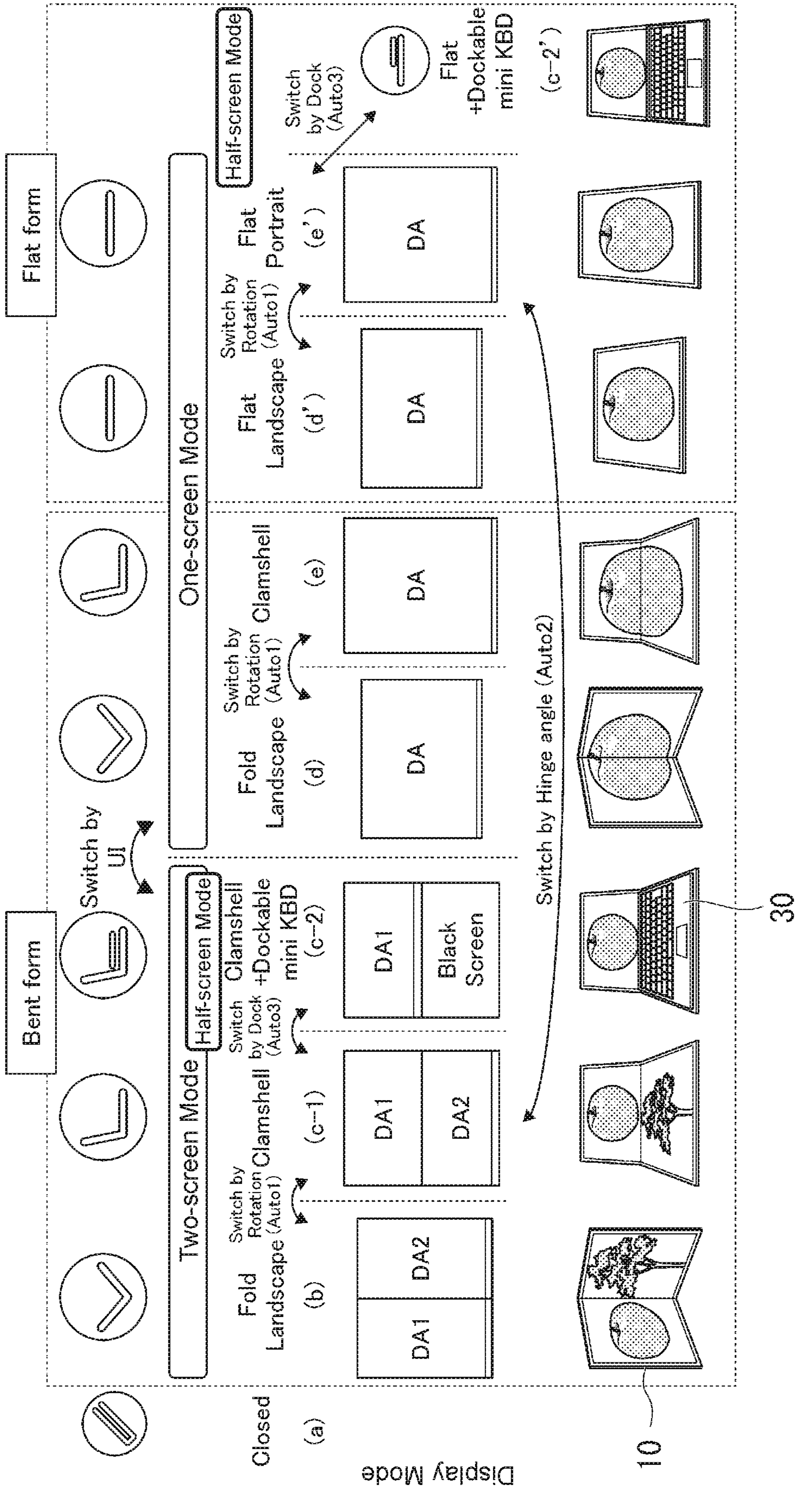
FIG. 5 is a diagram illustrating specific examples of various display modes of the information processing device according to one or more embodiments.

Referring next to FIG. 5, display modes in various usage forms of the information processing device 10 will be described in detail.

FIG. 5 is a diagram illustrating specific examples of various display modes of the information processing device 10 according to one or more embodiments. The display mode of the information processing device 10 varies depending on the usage form classified by the open angle θ between the first chassis 101 and the second chassis 102, the posture (orientation) of the information processing device 10, whether the display mode is the one-screen mode or the two-screen mode, and the like. Note that one screen is also called a single screen, and two screens are also called split screens or dual screens.

Display mode (a) is a display mode when the first chassis 101 and the second chassis 102 are in the closed state (Closed) as the usage form. For example, in this closed state, the information processing device 10 is in a standby state, such as a sleep state or a hibernation state, and the display unit 150 is in a display-off state. This standby state such as the sleep state or the hibernation state corresponds, for example, to S3 or S4 as system power status defined in the ACPI (Advanced Configuration and Power Interface) specifications.

Display mode (b) is a display mode when the first chassis 101 and the second chassis 102 are in the bent state (Bent form) as the usage form and in the two-screen mode in which display is controlled by splitting the screen area of the display 150 into the two display areas of the first display area DA1 and the second display area DA2. Further, the orientation of the information processing device 10 is an orientation in which the first display area DA1 and the second display area DA2 are lined up side by side in portrait orientation. The portrait orientation of the display areas means an orientation in which long sides of the four sides of each of the rectangular display areas are vertical and short sides are horizontal. When the display areas are in portrait orientation, the display orientation is also portrait, that is, the display is provided in such an orientation that the direction along the long sides corresponds to the up-down direction and the direction along the short sides corresponds to the left-right direction. This usage form is a usage form corresponding to the so-called book mode in which left and right pages when opening a book correspond to left and right screens. Since this usage form is in the bent state (Bent form) and the display area of two combined display areas of the first display area DA1 and the second display area DA2 lined up side by side is horizontally long, it is also called "Fold Landscape."

In this display mode (b), for example, the information processing device 10 is in such a two-screen display mode that the first display area DA1 on the left side is set as the primary screen and the second display area DA2 on the right side is set as the secondary screen in normal operating conditions. Note that the correspondences of the first display area DA1 and the second display area DA2 to the primary screen and the secondary screen in the display mode (b) may be reversed.

Like the display mode (b), display mode (c-1) is a display mode in the bent state (Bent form) when the display mode is the two-screen mode in which the display is so controlled that the screen area of the display 150 is split into two display areas of the first display area DA1 and the second display area DA2, but in a usage form different from the display mode (b) in the orientation of the information processing device 10. The orientation of the information processing device 10 is an orientation in which the first display area DA1 and the second display area DA2 are lined up and down in landscape orientation. The landscape orientation of the display areas means an orientation in which long sides of the four sides of each of the rectangular display areas are horizontal and short sides are vertical. When the display areas are in landscape orientation, the display orientation is also landscape, that is, the display is provided in such an orientation that the direction along the short sides corresponds to the up-down direction and the direction along the long sides corresponds to the left-right direction. This usage form is one of typical usage forms of a clamshell PC.

In this display mode (c-1), for example, the information processing device 10 is in such a two-screen display mode that the first display area DA1 is set as the primary screen and the second display area DA2 is set as the secondary screen in normal operating conditions. Note that the correspondences of the first display area DA1 and the second display area DA2 to the primary screen and the secondary screen in the display mode (c-1) may be reversed.

For example, the information processing device 10 detects a change in the posture (orientation) of the information processing device 10 to automatically switch from the display mode (b) to the display mode (c-1) or from the display mode (c-1) to the display mode (b) (Switch by Rotation). For example, since the display mode (c-1) is in such a state that the display 150 is rotated 90 degrees in the right direction from the state of the display mode (b) in FIG. 5, the information processing device 10 switches to the display mode (c-1) when detecting the rotation of a predetermined angle (for example, 45 degrees) or more in the right direction from the state of the display mode (b). Further, since the display mode (b) is in such a state that the display 150 is rotated 90 degrees in the left direction from the state of the display mode (c-1) in FIG. 5, the information processing device 10 switches to the display mode (b) when detecting the rotation of a predetermined angle (for example, 45 degrees) or more in the left direction from the state of the display mode (c-1).

Like the display mode (c-1), display mode (c-2) is in the bent state (Bent form) with the same orientation of the information processing device 10 but different in that an external keyboard 30 (Dockable mini KBD (KeyBoard)) connectable to the information processing device 10 is connected. This usage form is in such a state that a physical keyboard 30 is connected in general usage forms of the clamshell PC. For example, the size of the keyboard 30 is almost equivalent to the size of the second display area DA2, and the keyboard 30 is configured to be mountable on the second display area DA2. As an example, magnets are provided inside (the edges of) the bottom of the keyboard 30, and when the keyboard 30 is mounted on the second display area DA2, the magnets are attracted to metal parts of the inner surface edges of the second chassis 102 to fix the keyboard 30. Thus, the usage form becomes a usage form similar to that of a conventional clamshell PC with a physical keyboard originally provided therein. Further, the information processing device 10 and the keyboard 30 are connected, for example, through Bluetooth (registered trademark). In this display mode (c-2), since the keyboard makes the second display area DA2 invisible, the information processing device 10 controls the second display area DA2 to black display or display off. In other words, this display mode (c-2) is a display mode in which only a half screen is effective to provide a display (hereinafter called a "half-screen mode"), that is, a one-screen mode in which only the first display area DA1 is used.

For example, the information processing device 10 automatically switches from the display mode (c-1) to the display mode (c-2) when detecting the connection to an external keyboard in the state of the display mode (c-1) (Switch by Dock).

Like the display mode (b), display mode (d) is in the bent state (Bent form) with the same orientation of the information processing device 10 but different in that the display mode (d) is the one-screen mode in which the entire screen area of the display 150 is set as one display area DA to control the display. This usage form is in the one-screen mode different from that in the display mode (b). However, since the usage form is in the bent state (Bent form) and the display area DA is horizontally long, it is also called "Fold Landscape." The display area DA is in landscape orientation and the display orientation is also landscape.

Here, for example, switching between the one-screen mode and the two-screen mode in the bent state (Bent form) is performed with a user operation. For example, the information processing device 10 may display, on the task bar B2 (see FIG. 2), an operator as a UI (User Interface) capable of switching between the one-screen mode and the two-screen mode (hereinafter called a "display mode switching icon"). The display mode switching icon may also function as a toggle switch to switch alternately between the one-screen mode and the two-screen mode each time it is operated. As an example, when detecting an operation on the display mode switching icon in the state of the display mode (b), the information processing device 10 switches from the display mode (b) to the display mode (d) (Switch by UI).

Note that the UI to switch between the one-screen mode and the two-screen mode is not limited to the icon displayed on the task bar B2, and any other UI can be used. For example, the UI to switch between the one-screen mode and the two-screen mode may also be an icon to be displayed with an operation to a predetermined location on the task bar B2, rather than the icon displayed on the task bar B2 from the beginning. Further, the information processing device 10 may display a pop-up screen on which switching between the one-screen mode and the two-screen mode can be set to display the display mode switching icon inside the pop-up screen. Further, the specifications of the display mode switching icon may be such that the primary screen and the secondary screen can be replaced with each other in the two-screen mode in addition to switching between the one-screen mode and the two-screen mode. A specific example of this display mode switching icon will be described later.

Like the display mode (c-1), display mode (e) is in the bent state (Bent form) with the same orientation of the information processing device 10 but different in that the display mode (e) is the one-screen mode in which the entire screen area of the display 150 is set as one display area DA to control the display. This usage form is different from the display mode (c-1) in that it is the one-screen mode, but the usage form is considered to correspond to the usage form of the clamshell PC from the bent state (Bent form) and the orientation of the information processing device 10. The display area DA is in portrait orientation and the display orientation is also portrait.

For example, the information processing device 10 detects a change in the posture (orientation) of the information processing device 10 to automatically switch from the display mode (d) to the display mode (e) or from the display mode (e) to the display mode (d) (Switch by Rotation). For example, since the display mode (e) is in such a state that the display 150 is rotated 90 degrees in the right direction from the state of the display mode (d) in FIG. 5, the information processing device 10 switches to the display mode (e) when detecting the rotation of a predetermined angle (for example, 45 degrees) or more in the right direction from the state of the display mode (d). Further, since the display mode (d) is in such a state that the display 150 is rotated 90 degrees in the left direction from the state of the display mode (e), the information processing device 10 switches to the display mode (d) when detecting the rotation of a predetermined angle (for example, 45 degrees) or more in the left direction from the state of the display mode (e).

Like the display mode (d), display mode (d') is in the one-screen mode and the orientation of the information processing device 10 is such an orientation that the display area DA is horizontally long, but different in that the information processing device 10 is in the flat state (Flat form). The flat state (Flat form) is a state in which the open angle θ between the first chassis 101 and the second chassis 102 is substantially 180°. This usage form corresponds to the so-called tablet mode described with reference to FIG. 4. Since this usage form is in the flat state (Flat form) and the display area DA is horizontally long, it is also called "Flat Landscape." This display mode (d') differs from the display mode (d) only in the open angle θ between the first chassis 101 and the second chassis 102. Like in the display mode (d), the display area DA in the display mode (d') is in landscape orientation and the display orientation is also landscape.

Like the display mode (e), display mode (e') is in the one-screen mode and the orientation of the information processing device 10 is such an orientation that the display area DA is vertically long, but different in that the information processing device 10 is in the flat state (Flat form). Since this usage form is in the flat state (Flat form) and the display area DA is vertically long, it is also called "Flat Portrait." This display mode (e') differs from the display mode (e) only in the open angle θ between the first chassis 101 and the second chassis 102. Like in the display mode (e), the display area DA in the display mode (e') is in portrait orientation and the display orientation is also portrait.

For example, the information processing device 10 detects a change in the posture (orientation) of the information processing device 10 to automatically switch from the display mode (d') to the display mode (e') or from the display mode (e') to the display mode (d') (Switch by Rotation). For example, since the display mode (e') is in such a state that the display 150 is rotated 90 degrees in the right direction from the state of the display mode (d') in FIG. 5, the information processing device 10 switches to the display mode (e') when detecting the rotation of a predetermined angle (for example, 45 degrees) or more in the right direction from the state of the display mode (d'). Further, since the display mode (d') is in such a state that the display 150 is rotated 90 degrees in the left direction from the state of the display mode (e'), the information processing device 10 switches to the display mode (d') when detecting the rotation of a predetermined angle (for example, 45 degrees) or more in the left direction from the state of the display mode (e').

Note that in the display mode (d') and the display mode (e'), it is also possible to switch to the two-screen mode while keeping the flat state (Flat form) by the user operating the display mode switching icon described above. For example, when switching to the two-screen mode from the state of the display mode (d'), the display state becomes similar to the display mode (b) though the usage form is in the flat state (Flat form). Further, when switching to the two-screen mode from the state of the display mode (e'), the display state becomes similar to the display mode (c-1) though the usage form is in the flat state (Flat form).

Further, when detecting the connection with the keyboard 30 in the state of the display mode (e'), the information processing device 10 automatically switches from the display mode (e') to display mode (c-2') (Switch by Dock). The display mode (c-2') is in the flat state (Flat form) but different from the display mode (c-2) only in the open angle θ between the first chassis 101 and the second chassis 102. In this display mode (c-2'), since the second display area DA2 becomes invisible by the keyboard, the information processing device 10 performs control to provide a black display or turn off the display. In other words, like the display mode (c-2), this display mode (c-2') is a half-screen mode in which only one screen as a half screen is effective to provide a display.

Further, when detecting a change from the flat state (Flat form) to the bent state (Bent form), the information processing device 10 can switch from the one-screen mode to the two-screen mode. For example, when detecting a change to the bent state (Bent form) in the state of the display mode (d') based on the open angle θ between the first chassis 101 and the second chassis 102, the information processing device 10 automatically switches from the display mode (d') to the display mode (b). Further, when detecting a change to the bent state (Bent form) in the state of the display mode (e') based on the open angle θ between the first chassis 101 and the second chassis 102, the information processing device 10 automatically switches from the display mode (e') to the display mode (c-1).

Note that, for example, in the display modes (b), (c-1), (c-2), (d), (e), (d'), (e'), and (c-2'), the task bar (the task bar B2 illustrated in FIG. 2) is displayed only in one place inside the display area of the display unit 150 (for example, on the bottom of the display area) regardless of whether the screen mode is the one-screen mode or the two-screen mode. However, as described above, the task bar may be displayed in the first display area DA1 and the second display area DA2, respectively.

(Display Mode Switching Operation)

Next, a specific example of operation specifications upon switching the display mode with user operations will be described.

Figure 6A:
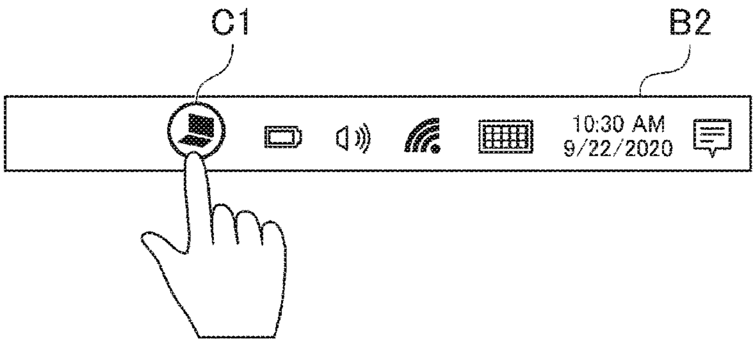
FIGS. 6(A)-(C) are diagrams illustrating an example of the operation specifications of display mode switching operations according to one or more embodiments.

FIG. 6 is a diagram illustrating an example of the operation specifications of the display mode switching operations according to one or more embodiments. For example, as illustrated in FIG. 6(A), icon C1 to display a display mode switching menu is displayed on the task bar B2. When this icon C1 is operated, the display mode switching menu is displayed as a pop-up screen. Note that the display mode switching menu may also be displayed as a pop-up screen upon a change from the bent state (Bent form) to the flat state (Flat form) in which the information processing device 10 is not bent. Further, the display mode switching menu may be displayed as a pop-up screen upon a change from the flat state (Flat form) to the bent state (Bent form).

On the switching menu, display mode switching icons are displayed as choices of the display mode to allow the user to instruct switching between the one-screen mode and the two-screen mode, and the replacement of pieces of display data to be displayed respectively in the first display area DA1 and the second display area DA2 in the two-screen mode (replacement of the primary screen and the secondary screen). On the switching menu, choices of the display mode selectable by the user depending on the usage form (the orientation of the display 150) at the time are displayed.

Figure 6B:
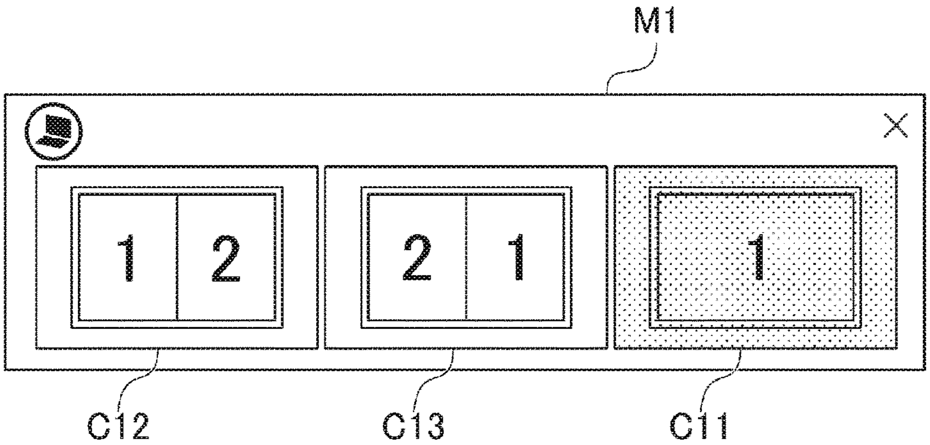

FIG. 6(B) illustrates switching menu M1 displayed when the usage form is "Landscape" (display mode (b), display mode (d), display mode (d'), etc.). Note that "1" in FIG. 6(B)

indicates the primary screen, and "2" indicates the secondary screen. On the switching menu M1, display mode switching icon C11, display mode switching icon C12, and display mode switching icon C13 are displayed. The display mode switching icon C11 is displayed as an operator for selecting the one-screen mode (the display mode (d) or the display mode (d')). The display mode switching icon C12 is displayed as an operator for selecting such a display mode that the first display area DA1 is the primary screen and the second display area DA2 is the secondary screen in the two-screen mode (the display mode (b)). The display mode switching icon C13 is displayed as an operator for selecting such a display mode that the second display area DA2 is the primary screen and the first display area DA1 is the secondary screen in the two-screen mode (the display mode (b)). In the following, the two-screen mode in which the second display area DA2 is the primary screen and the first display area DA1 is the secondary screen is called an "inverted two-screen mode" when there is a need to distinguish from the two-screen mode in which the first display area DA1 is the primary screen and the second display area DA2 is the secondary screen.

Note that the display mode switching icon corresponding to the current display mode is displayed in a display form distinguishable from the other display mode switching icons. Here, the display mode switching icon C11 is highlighted against the other display mode switching icons C12 and C13 to make the user understand the current display mode.

Figure 6C:
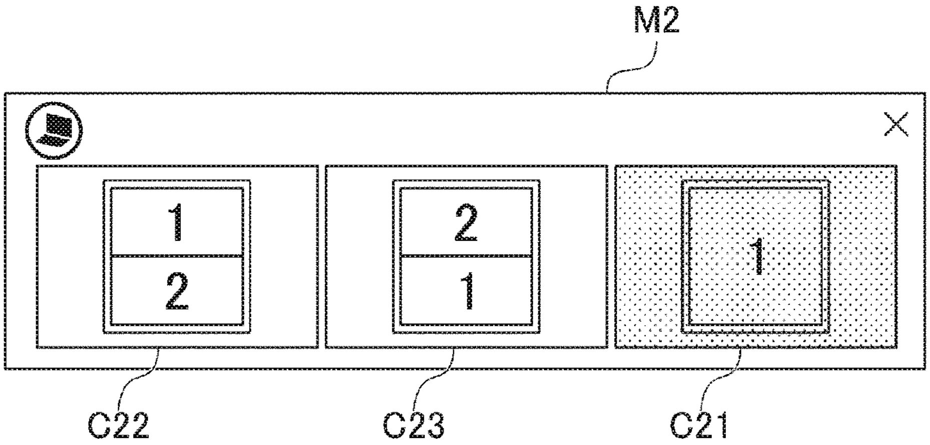

FIG. 6(C) illustrates switching menu M2 to be displayed when the usage form is "Clamshell" (display mode (c-1), display mode (e), display mode (e'), etc.). On the switching menu M2, display mode switching icon C21, display mode switching icon C22, and display mode switching icon C23 are displayed. The display mode switching icon C21 is displayed as an operator for selecting the one-screen mode (the display mode (e) or the display mode (e')). The display mode switching icon C22 is displayed as an operator for selecting such a display mode that the first display area DA1 is the primary screen and the second display area DA2 is the secondary screen in the two-screen mode (the display mode (c-1)). The display mode switching icon C23 is displayed as an operator for selecting such a display mode that the second display area DA2 is the primary screen and the first display area DA1 is the secondary screen in the two-screen mode (the display mode (c-1) (that is, the inverted two-screen mode).

Like the switching menu M1 illustrated in FIG. 6(B), the display mode switching icon corresponding to the current display mode is displayed in a display form distinguishable from the other display mode switching icons. Here, the display mode switching icon C21 is highlighted against the other display mode switching icons C22 and C23 to make the user understand the current display mode.

The user can arbitrarily select any of the display mode switching icons displayed on the switching menu M1 or the switching menu M2. When the user selects any of the display mode switching icons, the display of the switching menu is ended. Otherwise, when the user does not select any of the display mode switching icons even after the passage of a predetermined time period (for example, three to five seconds) after the switching menu M1 or the switching menu M2 is displayed, the display of the switching menu is ended. Further, in a case where the user operates a close button "x" in the top right of the switching menu, when the user performs an operation outside the screen of the pop-up switching menu, or when the orientation of the information processing device 10 is changed, the display of the switching menu is ended. When the screen mode is the two-screen mode after switching the display modes, the thumbnail window is displayed on the secondary screen, and the window of an app corresponding to a thumbnail image selected in the thumbnail window is displayed in maximized form. Note that in the state where the keyboard 30 is connected, since the screen mode is fixed to the half-screen mode (display mode (c-2)) in which only the display of the first display area DA1 is enabled, no switching menu is displayed.

(Display Control by Switching Display Mode)

Next, display control upon switching from the one-screen mode to the two-screen mode or to the inverted two-screen mode, and upon switching between the two-screen mode and the inverted two-screen mode will be described.

FIG. 7 is a diagram illustrating an example of display control by switching the display mode according to one or more embodiments. In FIG. 7, an example of display control when the usage form is "Landscape" is illustrated, but the same applies to the case where the usage form is "Clamshell." Further, the same applies regardless of whether the information processing device 10 is in the bent state (Bent form) or the flat state (Flat form).

Figures 7A, 7B, 7C:
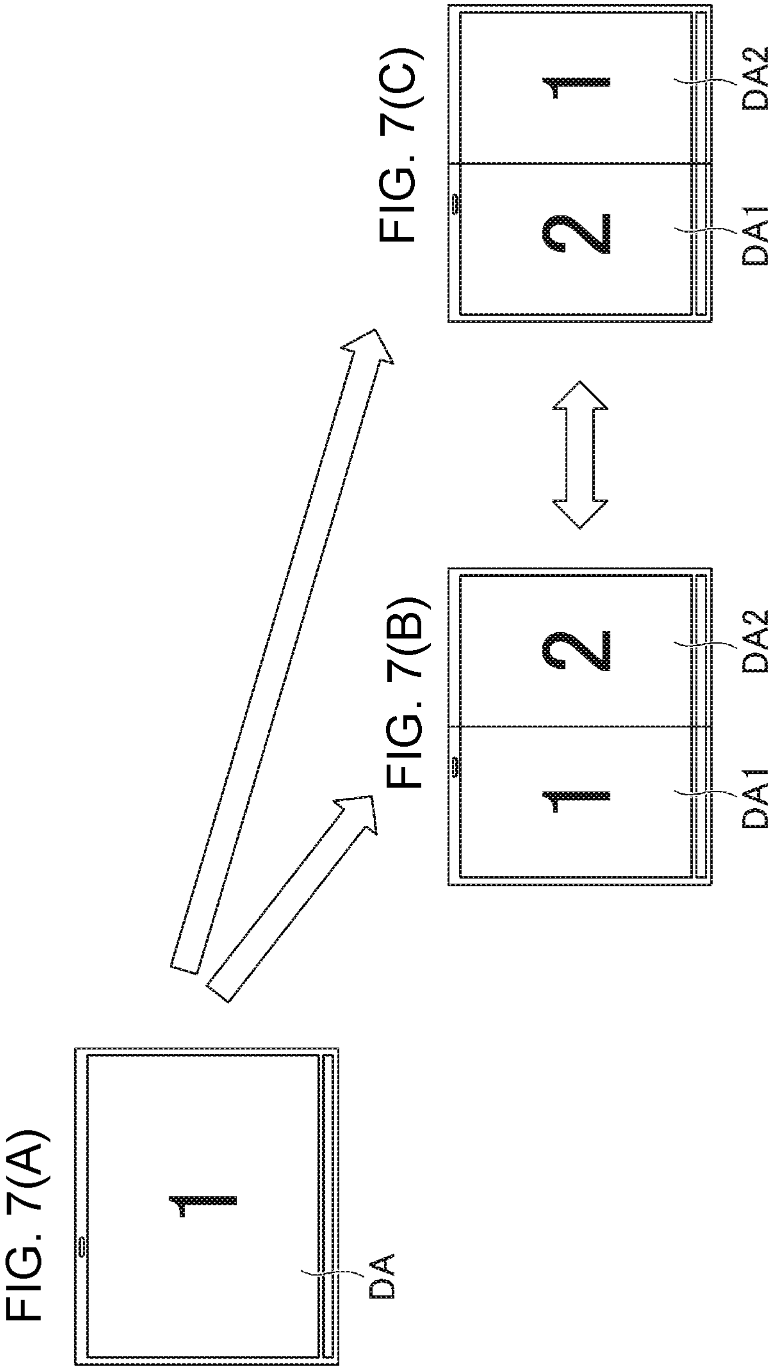
FIGS. 7(A)-(C) are diagrams illustrating an example of display control by display mode switching according to the embodiment.

FIG. 7(A) illustrates the one-screen mode, FIG. 7(B) illustrates the two-screen mode, and FIG. 7(C) illustrates the inverted two-screen mode, respectively. In the illustrated example of the two-screen mode, the first display area DA1 is the primary screen and the second display area DA2 is the secondary screen. On the other hand, in the illustrated example of the inverted two-screen mode, the second display area DA2 is the primary screen and the first display area DA1 is the secondary screen.

Upon switching from the one-screen mode (FIG. 7(A)) to the two-screen mode (FIG. 7(B)), an active window in the one-screen mode is displayed in the first display area DA1 (primary screen), and the thumbnail window is displayed in the second display area DA2 (secondary screen). Further, upon switching from the one-screen mode (FIG. 7(A)) to the inverted two-screen mode (FIG. 7(C)), the active window in the one-screen mode is displayed in the second display area DA2 (primary screen), and the thumbnail window is displayed in the first display area DA1 (secondary screen). In other words, upon switching from the one-screen mode to the two-screen mode or the inverted two-screen mode, the thumbnail window is always displayed on the secondary screen. After that, when any of thumbnail images displayed in the thumbnail window is selected by the user, a window of an app corresponding to the selected thumbnail image is displayed on the secondary screen as an active window (for example, full-screen display).

On the other hand, in the case of switching between the two-screen mode and the inverted two-screen mode, the display in a display area as the primary screen before switching is changed to the display in a display area as the primary screen after switching, and the display in a display area as the secondary screen before switching is changed to the display in a display area as the secondary screen after switching. Specifically, upon switching from the two-screen mode (FIG. 7(B)) to the inverted two-screen mode (FIG. 7(C)), an active window displayed in the first display area DA1 (primary screen) before switching is displayed in the second display area DA2 (primary screen) after switching, and an active window displayed in the second display area DA2 (secondary screen) before switching is displayed in the first display area DA1 (secondary screen) after switching. Further, upon switching from the inverted two-screen mode (FIG. 7(C)) to the two-screen mode (FIG. 7(B)), the active window displayed in the second display area DA2 (primary screen) before switching is displayed in the first display area DA1 (primary screen) after switching, and the active window displayed in the first display area DA1 (secondary screen) before switching is displayed in the second display area DA2 (secondary screen) after switching.

For example, when the thumbnail window is displayed on the secondary screen before switching, the thumbnail window is displayed on the secondary screen after switching. Further, when an active window is displayed on the secondary screen before switching, the active window is displayed on the secondary screen after switching. Thus, although the thumbnail window is first displayed on the secondary screen upon switching from the one-screen mode to the two-screen mode or the inverted two-screen mode, the display on the secondary screen before switching is maintained in the switching between the two-screen mode and the inverted two-screen mode like in the case of that on the primary screen.

Note that, when the number of running apps is two upon switching from the one-screen mode to the two-screen mode or the inverted two-screen mode, an active window in the one-screen mode may be displayed on the primary screen after switching, and an inactive window in the one-screen mode may be displayed on the secondary screen as an active window without displaying the thumbnail window. In this case, maximized windows may be displayed both on the primary screen and the secondary screen.

(Configuration of Information Processing Device 10)

Figure 8:
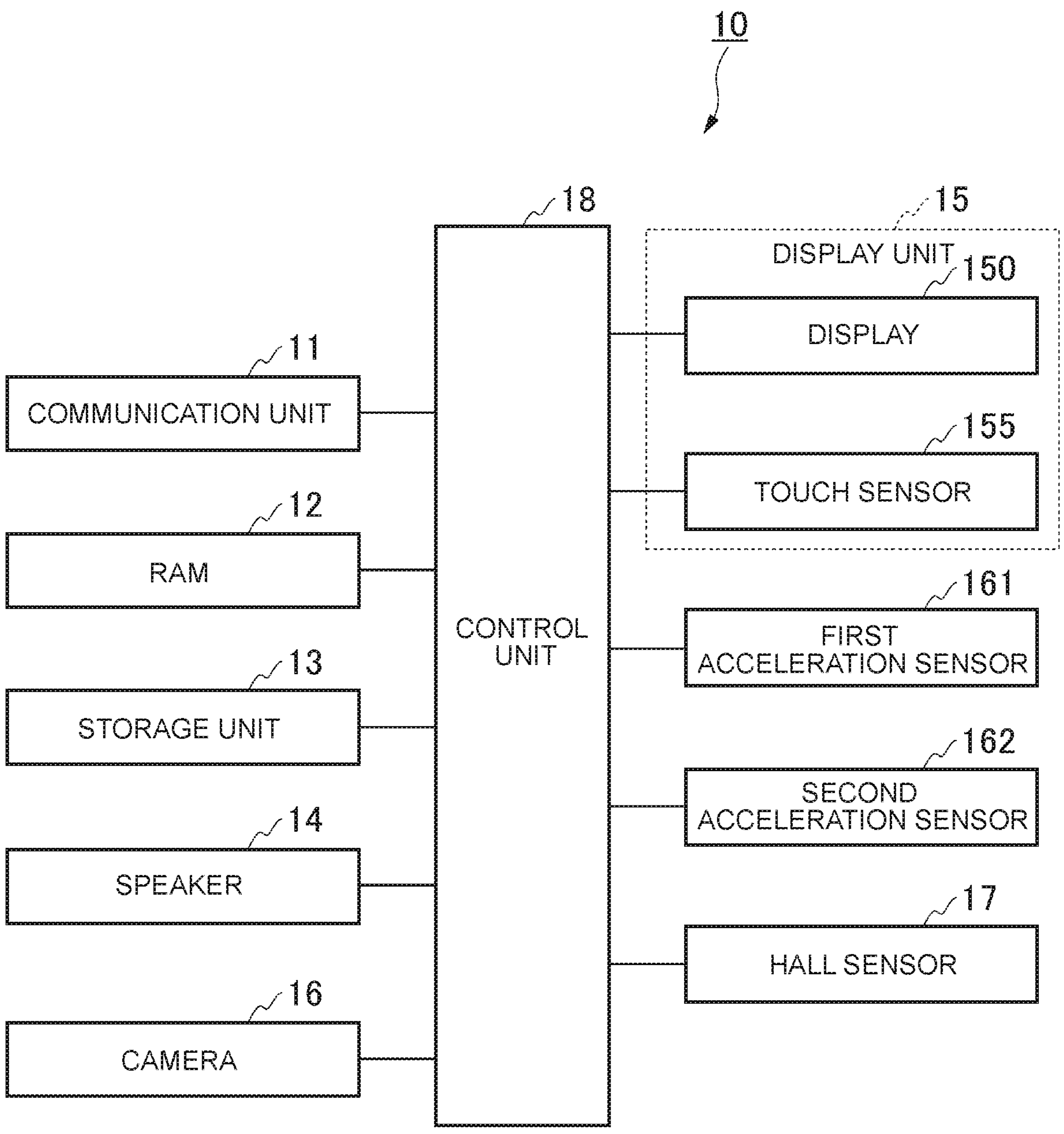
FIG. 8 is a block diagram illustrating a hardware configuration example of the information processing device according to one or more embodiments.

FIG. 8 is a block diagram illustrating an example of the hardware configuration of the information processing device 10 according to one or more embodiments. The information processing device 10 includes a communication unit 11, a RAM (Random Access Memory) 12, a storage unit 13, a speaker 14, a display unit 15, a camera 16, a first acceleration sensor 161, a second acceleration sensor 162, a Hall sensor 17, and a control unit 18. These units are connected communicably to one another through a bus or the like.

The communication unit 11 is, for example, configured to include digital input/output ports such as two or more Ethernet (registered trademark) ports and two or more USB (Universal Serial Bus) ports, communication devices for performing wireless communication such as Bluetooth (registered trademark) and Wi-Fi (registered trademark), and the like. For example, the communication unit 11 can communicate with the above-described external keyboard 30 and the like by using Bluetooth (registered trademark).

In the RAM 12, programs and data for processing executed by the control unit 18 are expanded, and various data are saved or deleted as appropriate. For example, the RAM 12 functions also as a video memory (V-RAM) for the display of the display 150. As an example, the RAM 12 functions as a video memory for data displayed in the display area DA when the display 150 is controlled in the one-screen mode. Further, the RAM 12 functions as a video memory for data displayed in the first display area DA1 and the second display area DA2 when the display 150 is controlled in the two-screen mode. Further, information on running apps, an app in use (an app as an active window) among the running apps, information on the other apps as inactive windows, information about in which display area each window is displayed, and the like are stored in the RAM 12. Note that, since the RAM 12 is a volatile memory, no data is held after the supply of power is stopped. Data necessary to be held when the power supply to the RAM 12 is stopped is moved to the storage unit 13.

The storage unit 13 is configured to include one or more of an SSD (Solid State Drive), an HDD (Hard Disk Drive), a ROM (Read Only Memory), a Flash-ROM, and the like. For example, in the storage unit 13, a BIOS (Basic Input Output System) program and setting data, an OS (Operating System) and app programs running on the OS, various data used in the apps, and the like are stored.

The speaker 14 outputs electronic sound, voice, and the like.

The display unit 15 includes the display 150 and a touch sensor 155. As described above, the display 150 is a flexible display flexible according to the open angle θ by the relative rotation between the first chassis 101 and the second chassis 102. Under the control of the control unit 18, the display 150 provides a display corresponding to each display mode described with reference to FIG. 5. The touch sensor 155 is provided on the screen of the display 150 to detect a touch operation on the screen. For example, in the one-screen mode, the touch sensor 155 detects a touch operation in the display area DA. Further, in the two-screen mode, the touch sensor 155 detects a touch operation(s) in either or both of the first display area DA1 and the second display area DA2. The touch operations include a tap operation, a slide operation, a flick operation, a swipe operation, a pinch operation, and the like. The touch sensor 155 detects a touch operation and outputs, to the control unit 18, operation information based on the detected operation.

The camera 16 is configured to include a lens, an image sensor, and the like. The camera 16 captures an image (still image or video) under the control of the control unit 18 and outputs data of the captured image.

The first acceleration sensor 161 is provided inside the first chassis 101 to detect the orientation of the first chassis 101 and a change in orientation. For example, when a direction parallel to the long-side direction of the first display area DA1 is set as an X1 direction, a direction parallel to the short-side direction of the first display area DA1 is set as a Y1 direction, and a direction perpendicular to the X1 direction and the Y1 direction is set as a Z1 direction, the first acceleration sensor 161 detects acceleration in the X1 direction, the Y1 direction, and the Z1 direction, respectively, and outputs the detection results to the control unit 18.

The second acceleration sensor 162 is provided inside the second chassis 102 to detect the orientation of the second chassis 102 and a change in orientation. For example, when a direction parallel to the long-side direction of the second display area DA2 is set as an X2 direction, a direction parallel to the short-side direction of the second display area DA2 is set as a Y2 direction, and a direction perpendicular to the X2 direction and the Y2 direction is set as a Z2 direction, the second acceleration sensor 162 detects acceleration in the X2 direction, the Y2 direction, and the Z2 direction, respectively, and outputs the detection results to the control unit 18.

The Hall sensor 17 is provided to detect the connection of the keyboard 30. For example, when the keyboard 30 is mounted on the second display area DA2 of the second chassis 102, a magnetic field changes due to the approach of a magnet provided inside the bottom of the keyboard 30 to change the detection value (output value) of the Hall sensor 17. In other words, the Hall sensor 17 outputs a different detection result depending on whether or not the keyboard 30 is mounted.

The control unit 18 is configured to include processors such as a CPU (Central Processing Unit), a GPU (Graphic Processing Unit), and a microcomputer to implement various functions by executing programs (BIOS, OS, and various programs running on the OS) stored in the storage unit 13 and the like. For example, based on the detection results of the first acceleration sensor 161 and the second acceleration sensor 162, the control unit 18 detects the posture (orientation) of the information processing device 10. Further, based on the detection results of the first acceleration sensor 161 and the second acceleration sensor 162, the control unit 18 detects whether the information processing device 10 is in the open state or the closed state, and in the open state, the control unit 18 detects whether the information processing device 10 is in the bent state (Bent form) or the flat state (Flat form).

Further, the control unit 18 detects a display mode switching operation by the user (for example, an operation on a display mode switching icon illustrated in FIG. 6). Further, based on the detection result of the Hall sensor 17, the control unit 18 detects the connection with the keyboard 30. Note that the connection with this keyboard 30 means the mounting of the keyboard 30 on the second display area DA2, but does not mean communication connection. As for the communication connection with the keyboard 30, the control unit 18 detects it using the function of Bluetooth (registered trademark) or the like.

Further, the control unit 18 performs display control on the display 150 described with reference to FIG. 5 and FIG. 6 by detecting the system state, the posture (orientation) of the information processing device 10, whether the information processing device 10 is in the open state or the closed state, whether the information processing device 10 is in the bent state (Bent form) or the flat state (Flat form) in the case of the open state, the display mode switching operation by the user, the connection with the keyboard 30, and the like.

Next, a functional configuration related to display control processing among pieces of processing executed by the control unit 18 will be described.

Figure 9:
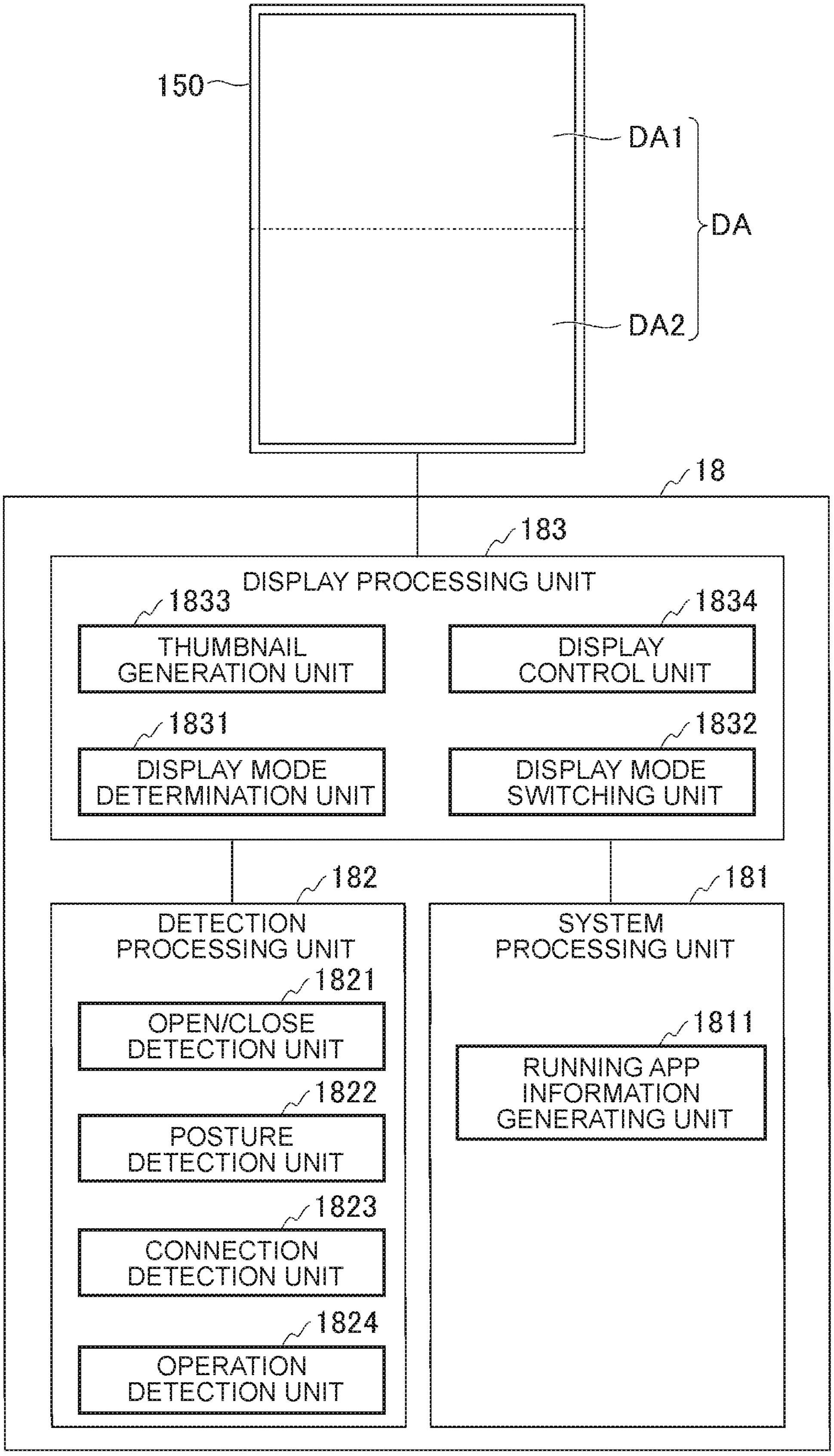
FIG. 9 is a block diagram illustrating a functional configuration example related to display control processing according to one or more embodiments.

FIG. 9 is a block diagram illustrating an example of a functional configuration related to the display control processing according to one or more embodiments. The control unit 18 includes a system processing unit 181, a detection processing unit 182, and a display processing unit 183. Here, the system processing unit 181 is a functional component the processing of which is executed by the CPU based, for example, on the OS or the BIOS. Further, the detection processing unit 182 is a functional component to cause a microcomputer other than the CPU that executes processing based, for example, on the OS or the BIOS to execute various detection processing. The display processing unit 183 is a functional component the processing of which is executed by the CPU based, for example, on a program running on the OS.

The system processing unit 181 boots the OS and executes various programs such as drivers and apps running on the OS. Further, the system processing unit 181 has a running app information generating unit 1811 which generates app information including information indicative of running apps (for example, information including app IDs), information indicative of an app being used by the user among running apps (i.e., an app the window of which is active), and the like. The system processing unit 181 stores, in the RAM 12, the app information generated by the running app information generating unit 1811.

The detection processing unit 182 has an open/close detection unit 1821, a posture detection unit 1822, and a connection detection unit 1823 as functional components to detect the state of the information processing device 10. The open/close detection unit 1821 detects whether the information processing device 10 is in the open state or the closed state based on the detection results of the first acceleration sensor 161 and the second acceleration sensor 162. Further, when the information processing device 10 is in the open state, the open/close detection unit 1821 detects the open angle θ between the first chassis 101 and the second chassis 102 based on the detection results of the first acceleration sensor 161 and the second acceleration sensor 162. Then, based on the detected open angle θ, the open/close detection unit 1821 detects whether the first chassis 101 and the second chassis 102 are in the bent state (Bent form) or the flat state (Flat form). The posture detection unit 1822 detects the posture (orientation) of the information processing device 10 based on the detection results of the first acceleration sensor 161 and the second acceleration sensor 162. The connection detection unit 1823 detects the connection with the keyboard 30. For example, based on the detection result of the Hall sensor 17, the connection detection unit 1823 detects whether or not the keyboard 30 is mounted on the second display area DA2 to detect the connection with the keyboard 30. The detection processing unit 182 outputs, to the display processing unit 183, the detection results (the state of the information processing device 10) by the open/close detection unit 1821, the posture detection unit 1822, and the connection detection unit 1823.

The detection processing unit 182 further has an operation detection unit 1824 as a functional component to detect an operation to the information processing device 10. The operation detection unit 1824 detects a user operation based on the operation information output from the touch sensor 155 provided on the screen of the display 150. For example, the operation detection unit 1824 acquires operation information based on a user operation on a switching menu screen (see FIG. 6) switchable between display modes to detect a display mode switching operation by the user to switch between display modes based on the acquired operation information. The detection processing unit 182 outputs, to the display processing unit 183, the detected user operation information.

The display processing unit 183 determines a display mode and switches between the display modes based on the open/closed state and the posture (orientation) of the information processing device 10, the user operation, and the like acquired from the detection processing unit 182. Further, based on the app information acquired from the system processing unit 181, the display processing unit 183 controls the display of the windows of running apps (active window and inactive window) according to the display mode. Specifically, the display processing unit 183 has a display mode determination unit 1831, a display mode switching unit 1832, a thumbnail generation unit 1833, and a display control unit 1834.

The display mode determination unit 1831 performs determination processing to determine the display mode based on the state of the information processing device 10 detected by the detection processing unit 182 or the detection result of the user operation. For example, the display mode determination unit 1831 acquires, from the detection processing unit 182, the detection result of the open/closed state of the information processing device 10, the detection result of whether the first chassis 101 and the second chassis 102 are in the bent state (Bent form) or the flat state (Flat form) in the case of the open state, the detection result of the posture (orientation) of the information processing device 10, and the user operation information. Then, based on the respective detection results and the operation information acquired from the detection processing unit 182, the display mode determination unit 1831 determines the display mode as described with reference to FIG. 5.

The display mode switching unit 1832 performs display mode switching processing to switch between the display modes described with reference to FIG. 5 based on the display mode determined by the display mode determination unit 1831. For example, based on the display mode determined by the display mode determination unit 1831, the display mode switching unit 1832 sets the display mode such as switching between the one-screen mode and the two-screen mode (or inverted two-screen mode), the orientation of each display area, and the display content of each display area. The display control unit 1834 performs display control processing to output display data to be displayed in each display area and display the display-data in each display area according to the display mode set by the display mode switching unit 1832.

Here, the operation of the display control processing executed by the control unit 18 will be described.

Figure 10:
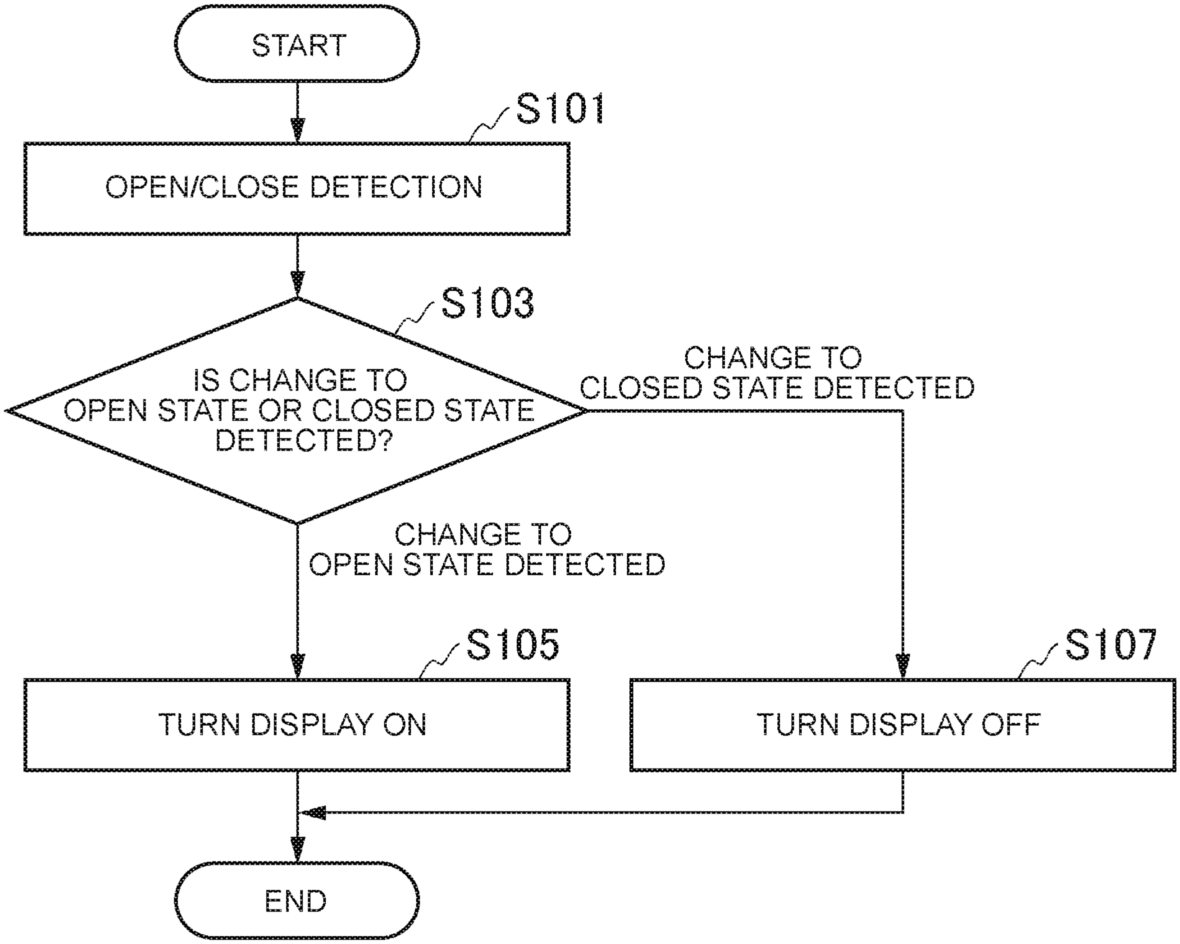
FIG. 10 is a flowchart illustrating an example of display control processing based on open/close detection according to one or more embodiments.

FIG. 10 is a flowchart illustrating an example of the display control processing based on the open/close detection according to one or more embodiments.

(Step S101) Based on the detection results of the first acceleration sensor 161 and the second acceleration sensor 162, the control unit 18 detects whether the information processing device 10 is in the open state or the closed state. Then, the control unit 18 proceeds to a process in step S103.

(Step S103) Based on the detection result in step S101, the control unit 18 determines whether a change in the information processing device 10 from the closed state to the open state or from the open state to the closed state is detected. When determining that the change from the closed state to the open state is detected, the control unit 18 proceeds to a process in step S105. On the other hand, when determining that the change from the open state to the closed state is detected, the control unit 18 proceeds to a process in step S107.

(Step S105) When determining that the change from the closed state to the open state is detected, the control unit 18 controls the display of the display 150 to be turned on.

(Step S107) When determining that the change from the open state to the closed state is detected, the control unit 18 controls the display of the display 150 to be turned off.

Note that this display control processing is executed repeatedly, for example, at predetermined intervals. In a state where the display is controlled to be on, display mode switching processing to switch between the one-screen mode and the two-screen mode (or the inverted two-screen mode) is executed as described below.

Next, the operation of display mode switching processing executed by the control unit 18 will be described.

Figure 11:
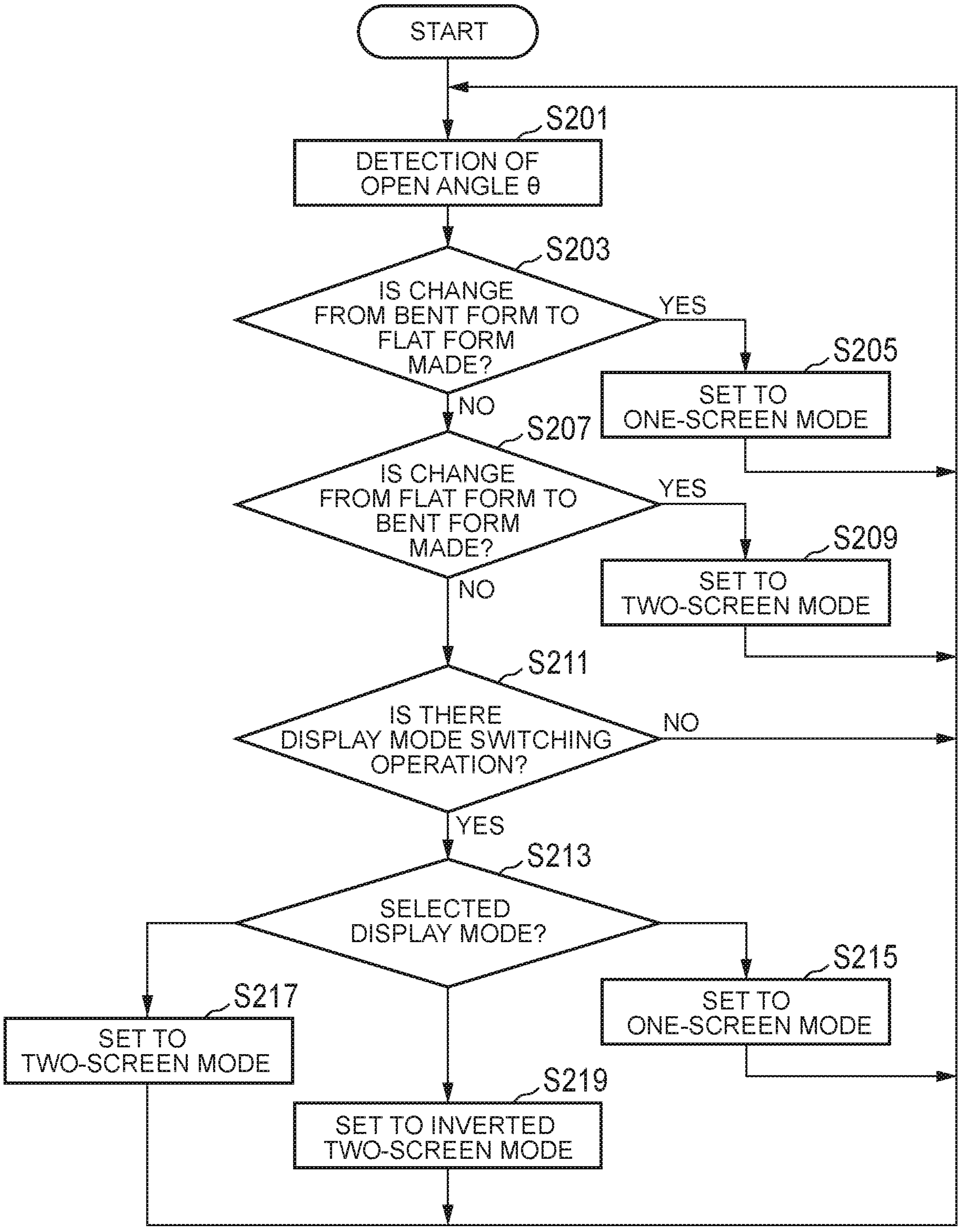
FIG. 11 is a flowchart illustrating an example of display mode switching processing according to one or more embodiments.

FIG. 11 is a flowchart illustrating an example of display mode switching processing according to one or more embodiments. Here, the display mode switching processing will be described as processing after the control unit 18 detects the change from the closed state to the open state in the display control processing based on the open/close detection illustrated in FIG. 10 to control the display to be turned on.

(Step S201) The control unit 18 detects the open angle θ between the first chassis 101 and the second chassis 102 based on the detection results of the first acceleration sensor 161 and the second acceleration sensor 162. Then, the control unit 18 proceeds to a process in step S203.

(Step S203) Based on the open angle θ detected in step S201, the control unit 18 determines whether or not a change from the bent state (Bent form) to the flat state (Flat form) is made. When determining that the change from the bent state (Bent form) to the flat state (Flat form) is made (YES), the control unit 18 proceeds to a process in step S205. On the other hand, when determining that the change from the bent state (Bent form) to the flat state (Flat form) is not made (NO), the control unit 18 proceeds to a process in step S207.

(Step S205) When determining in step S203 that the change from the bent state (Bent form) to the flat state (Flat form) is made, the control unit 18 sets the screen mode to the one-screen mode. For example, when the setting of the screen mode immediately before the above determination is the two-screen mode, the control unit 18 switches from the two-screen mode to the one-screen mode. On the other hand, when the setting of the screen mode immediately before the above determination is the one-screen mode, the control unit 18 continues the setting of the one-screen mode. Note that the control unit 18 controls the display mode to the display mode (d') or the display mode (e') illustrated in FIG. 5 based on the posture (orientation) of the information processing device 10 detected based on the detection results of the first acceleration sensor 161 and the second acceleration sensor 162. Then, the control unit 18 returns to the process in step S201.

(Step S207) Based on the open angle θ detected in step S201, the control unit 18 determines whether or not the change from the flat state (Flat form) to the bent state (Bent form) is made. When determining that the change from the flat state (Flat form) to the bent state (Bent form) is made (YES), the control unit 18 proceeds to a process in step S209. On the other hand, when determining that the change from the flat state (Flat form) to the bent state (Bent form) is not made (NO), the control unit 18 proceeds to a process in step S211.

(Step S209) When determining in step S207 that the change from the flat state (Flat form) to the bent state (Bent form) is made, the control unit 18 sets the screen mode to the two-screen mode. For example, when the setting of the screen mode immediately before the above determination is the two-screen mode, the control unit 18 continues the setting of the two-screen mode. On the other hand, when the setting of the screen mode immediately before the above determination is the one-screen mode, the control unit 18 switches from the one-screen mode to the two-screen mode. Note that the control unit 18 controls the display mode to the display mode (b) or the display mode (c-1) illustrated in FIG. 5 based on the posture (orientation) of the information processing device 10 detected based on the detection results of the first acceleration sensor 161 and the second acceleration sensor 162. Then, the control unit 18 returns to the processing in step S201.

(Step S211) Based on the operation information output from the touch sensor 155, the control unit 18 determines whether or not there is a display mode switching operation by the user. For example, when there is an operation to select any of the display mode switching icons displayed on the switching menu M1 or the switching menu M2 displayed in FIG. 6, the control unit 18 determines that there is the display mode switching operation. When determining that there is the display mode switching operation (YES), the control unit 18 proceeds to a process in step S213. On the other hand, when determining that there is no display mode switching operation (NO), the control unit 18 returns to the process in step S201.

(Step S213) The control unit 18 determines a display mode of the display mode switching icon selected with the display mode switching operation by the user to control the display mode. For example, when there is an operation to select the display mode switching icon C11 or C21 (see FIG. 6) corresponding to the one-screen mode, the control unit 18 proceeds to a process in step S215. Further, when there is an operation to select the display mode switching icon C12 or C22 (see FIG. 6) corresponding to the two-screen mode, the control unit 18 proceeds to a process in step S217. Further, when there is an operation to select the display mode switching icon C13 or C23 (see FIG. 6) corresponding to the inverted two-screen mode, the control unit 18 proceeds to a process in step S219.

(Step S215) The control unit 18 sets the display mode to that of the one-screen mode. For example, when the setting of the display mode before the display mode switching operation is performed is the two-screen mode, the control unit 18 switches from the two-screen mode to the one-screen mode. On the other hand, when the setting of the display mode before the display mode switching operation is performed is the one-screen mode, the control unit 18 continues the setting of the one-screen mode. Specifically, when there is an operation to select the display mode switching icon C11, the control unit 18 controls the display mode to the display mode (d) in the case of the bent state (Bent form) or to the display mode (d') in the case of the flat state (Flat form). On the other hand, when there is an operation to select the display mode switching icon C21, the control unit 18 controls the display mode to the display mode (e) or the display mode (e'). Then, the control unit 18 returns to the process in step S201.

(Step S217) The control unit 18 sets the display mode to that of the two-screen mode. For example, when the setting of the display mode before the display mode switching operation is performed is the one-screen mode, the control unit 18 switches from the one-screen mode to the two-screen mode. Further, when the setting of the display mode before the display mode switching operation is performed is the inverted two-screen mode, the control unit 18 switches from the inverted two-screen mode to the two-screen mode. Further, when the setting of the display mode before the display mode switching operation is performed is the two-screen mode, the control unit 18 continues the setting of the two-screen mode. Specifically, when there is an operation to select the display mode switching icon C12, the control unit 18 controls the display mode to the display mode (b) in the case of the bent state (Bent form), or in the case of the flat state (Flat form), the control unit 18 controls to provide a display similar to the display mode (b) in the flat state (Flat form). Further, when there is an operation to select the display mode switching icon C22, the control unit 18 controls the display mode to the display mode (c-1) in the case of the bent state (Bent form), or in the case of the flat state (Flat form), the control unit 18 controls to provide a display similar to the display mode (c-1) in the flat state (Flat form). At this time, in both of the display mode (b) and the display mode (c-1), the first display area DA1 is the primary screen and the second display area DA2 is the secondary screen. Then, the control unit 18 returns to the process in step S201.

(Step S219) The control unit 18 sets the display mode to that of the inverted two-screen mode. For example, when the setting of the display mode before the display mode switching operation is performed is the one-screen mode, the control unit 18 switches from the one-screen mode to the inverted two-screen mode. Further, when the setting of the display mode before the display mode switching operation is performed is the two-screen mode, the control unit 18 switches from the two-screen mode to the inverted two-screen mode. Further, when the setting of the display mode before the display mode switching operation is performed is the inverted two-screen mode, the control unit 18 continues the setting of the inverted two-screen mode. Specifically, when there is an operation to select the display mode switching icon C13, the control unit 18 controls the display mode to the display mode (b) in the case of the bent state (Bent form), or in the case of the flat state (Flat form), the control unit 18 controls to provide a display similar to the display mode (b) in the flat state (Flat form). Further, when there is an operation to select the display mode switching icon C23, the control unit 18 controls the display mode to the display mode (c-1) in the case of the bent state (Bent form), or in the case of the flat state (Flat form), the control unit 18 controls to provide a display similar to the display mode (c-1) in the flat state (Flat form). At this time, in both of the display mode (b) and the display mode (c-1), the second display area DA2 is the primary screen and the first display area DA1 is the secondary screen. Then, the control unit 18 returns to the process in step S201.

Note that the control unit 18 may also be configured not to automatically switch the display mode according to the change between the bent state (Bent form) and the flat state (Flat form) that is not bent. In this configuration, the control unit 18 performs the processes in steps S211 to S219 without performing the processes in steps S201 to S209 in the processing example illustrated in FIG. 11. Further, the control unit 18 may be configured to have a control mode to automatically switch the display mode according to the change between the bent state (Bent form) and the flat state (Flat form) that is not bent, and a control mode not to automatically switch the display mode, where these control modes may be selectable by the user.

Further, although the control unit 18 determines in step S211 whether or not there is the display mode switching operation by the user, the operation target (for example, the switching menu M1 or the switching menu M2 illustrated in FIG. 5) operated by the user at this time is pop-up displayed according to the operation (for example, the operation on the icon C1 illustrated in FIG. 5) by the user. On the other hand, when the control unit 18 is configured not to automatically switch the display mode according to the change between the bent state (Bent form) and the flat state (Flat form) that is not bent (or in the control mode), the configuration may also be such that the operation target (for example, the switching menu M1 or the switching menu M2 illustrated in FIG. 5) operated by the user according to the change between the bent state (Bent form) and the flat state (Flat form) that is not bent is displayed. In this case, the control unit 18 displays the operation target (for example, the switching menu M1 or the switching menu M2 illustrated in FIG. 5) operated by the user as the results of the YES determinations in step S203 and step S207 without performing the processes in step S205 and step S209 in the processing example illustrated in FIG. 11, and the control unit 18 proceeds to the process in step S211.

Returning to FIG. 9, the thumbnail generation unit 1833 generates thumbnail images corresponding to inactive windows among the windows of running apps. The thumbnail images are displayed in the thumbnail window (see FIG. 2). The display control unit 1834 outputs and displays display-data of the window of an app to be displayed in each display area and the thumbnail window according to the display mode set by the display mode switching unit 1832.

For example, in response to switching from the one-screen mode to the two-screen mode, the display control unit 1834 displays, in the first display area DA1, an active window displayed in the display area DA in the one-screen mode. Note that the first display area DA1 is set to the primary screen by default upon switching to the two-screen mode. Further, when switching from the one-screen mode to the two-screen mode or the inverted two-screen mode is performed by the display mode switching unit 1832, the display control unit 1834 displays an active window in the one-screen mode in a display area as the primary screen between the first display area DA1 and the second display area DA2, and displays the thumbnail window in a display area as the secondary screen between the first display area DA1 and the second display area DA2. On the other hand, when switching between the two-screen mode and the inverted two-screen mode is performed by the display mode switching unit 1832, the display control unit 1834 displays, in a display area as the primary screen after switching, an active window displayed in a display area as the primary screen before switching, and provides the display in a display area as the secondary screen before switching to the display in a display area as the secondary screen after switching.

For example, when the thumbnail window is displayed in the display area as the secondary screen before switching, the display control unit 1834 also displays the thumbnail window in the display area as the secondary screen after switching. Further, when an active window selected from the thumbnail window (thumbnail images) is displayed in the display area as the secondary screen before switching, the display control unit 1834 also displays the active window in the display area as the secondary screen after switching.

Note that in a case where the number of running apps is two, when switching from the one-screen mode to the two-screen mode or the inverted two-screen mode is performed by the display mode switching unit 1832, the display control unit 1834 may display an active window in the one-screen mode in a display area as the primary screen between the first display area DA1 and second display area DA2, and display an inactive window other than the active window in the one-screen mode in a display area as the secondary screen between the first display area DA1 and the second display area DA2.

Here, the operation of display control processing upon switching from the one-screen mode to the two-screen mode (or the inverted two-screen mode) will be described.

Figure 12:
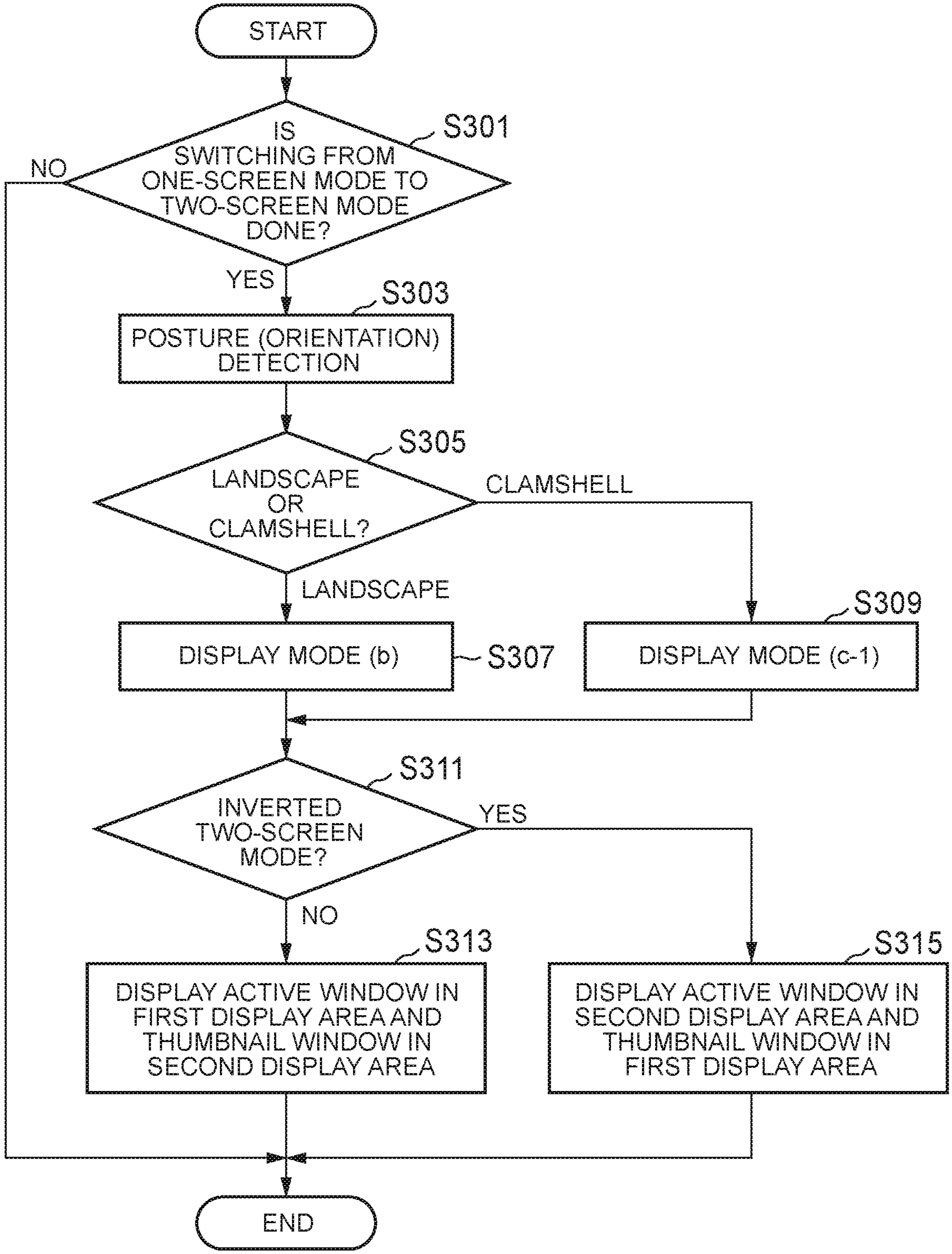
FIG. 12 is a flowchart illustrating an example of display control processing upon switching from a one-screen mode to a two-screen mode according to one or more embodiments.

FIG. 12 is a flowchart illustrating an example of display control processing upon switching from the one-screen mode to the two-screen mode according to one or more embodiments.

(Step S301) The control unit 18 determines whether or not switching from the one-screen mode to the two-screen mode is done. When determining that switching from the one-screen mode to the two-screen mode is not done (NO), the control unit 18 continues the one-screen mode, and the processing is ended without displaying the thumbnail window. On the other hand, when determining that switching from the one-screen mode to the two-screen mode is done (YES), the control unit 18 proceeds to a process in step S303.

(Step S303) The control unit 18 detects the posture (orientation) of the information processing device 10 based on the detection results of the first acceleration sensor 161 and the second acceleration sensor 162. Then, the control unit 18 proceeds to a process in step 305.

(Step S305) Based on the posture (orientation) of the information processing device 10 detected in step S303, the control unit 18 determines whether the usage form of the information processing device 10 is "Landscape" or "Clamshell." For example, when determining the "Landscape," the control unit 18 proceeds to a process in step S307. On the other hand, when determining "Clamshell," the control unit 18 proceeds to a process in step S309.

(Step S307) When determining "Landscape," the control unit 18 controls the display mode to the display mode (b) (see FIG. 5). Note that the display mode (b) is an example of the display mode (Fold Landscape) in the bent state (Bent form), but the same also applies to the flat state (Flat form). Then, the control unit 18 proceeds to step S311.

(Step S309) When determining "Clamshell," the control unit 18 controls the display mode to the display mode (c-1) (see FIG. 5). Note that the display mode (c-1) is an example of the display mode in the bent state (Bent form), but the same also applies to the flat state (Flat form). Then, the control unit 18 proceeds to a process in step S311.

(Step S311) The control unit 18 determines whether or not the switching from the one-screen mode to the two-screen mode is switching to the inverted two-screen mode. When determining that it is not switching to the inverted two-screen mode (NO), the control unit 18 proceeds to a process in step S313. On the other hand, when determining that it is switching to the inverted two-screen mode (YES), the control unit 18 proceeds to a process in step S315.

(Step S313) The control unit 18 displays an active window in the one-screen mode in the first display area DA1 (primary screen), and displays the thumbnail window in the second display area DA2 (secondary screen).

(Step S315) The control unit 18 displays the active window in the one-screen mode in the second display area DA2 (primary screen), and displays the thumbnail window in the first display area DA1 (secondary screen).

Next, the operation of display control processing when switching between the two-screen mode and the inverted two-screen mode is performed will be described.

Figure 13:
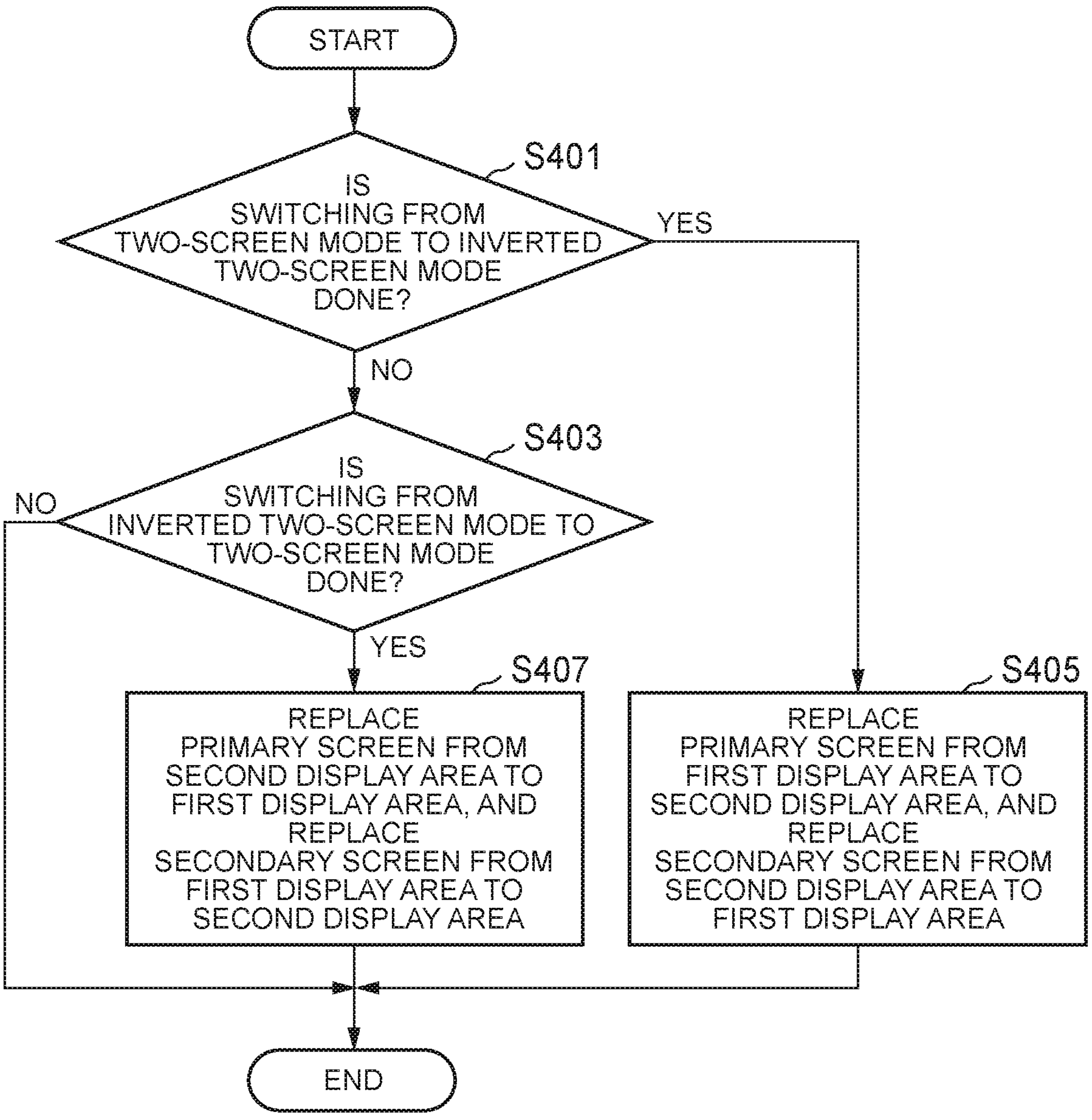
FIG. 13 is a flowchart illustrating an example of display control processing upon switching between the two-screen mode and an inverted two-screen mode according to one or more embodiments.

FIG. 13 is a flowchart illustrating an example of display control processing upon switching between the two-screen mode and the inverted two-screen mode according to one or more embodiments.

(Step S401) The control unit 18 determines whether or not the switching is switching from the two-screen mode to the inverted two-screen mode. When determining that it is switching from the two-screen mode to the inverted two-screen (YES), the control unit 18 proceeds to a process in step S405. On the other hand, when determining that it is not switching from the two-screen mode to the inverted two-screen (NO), the control unit 18 proceeds to a process in step S403.

(Step S403) The control unit 18 determines whether or not the switching is switching from the inverted two-screen mode to the two-screen mode. When determining that it is switching from the inverted two-screen mode to the two-screen mode (YES), the control unit 18 proceeds to a process in step S407. On the other hand, when determining that it is not switching from the inverted two-screen mode to the two-screen mode (NO), the control unit 18 ends the processing without switching the display.

(Step S405) The control unit 18 replaces the primary screen from the first display area DA1 to the second display area DA2 to change the display in the first display area DA1 before switching to the display in the second display area DA2 after switching. Further, the control unit 18 replaces the secondary screen from the second display area DA2 to the first display area DA1 to change the display in the second display area DA2 before switching to the display in the first display area DA1 after switching.

(Step S407) The control unit 18 replaces the primary screen from the second display area DA2 to the first display area DA1, and changes the display in the second display area DA2 before switching to the display in the first display area DA1 after switching. Further, the control unit 18 replaces the secondary screen from the first display area DA1 to the second display area DA2, and changes the display in the first display area DA1 before switching to the display in the second display area DA2 after switching.

Next, the operation of display control processing when a thumbnail image displayed in the thumbnail window is selected in the two-screen mode or the inverted two-screen mode will be described.

Figure 14:
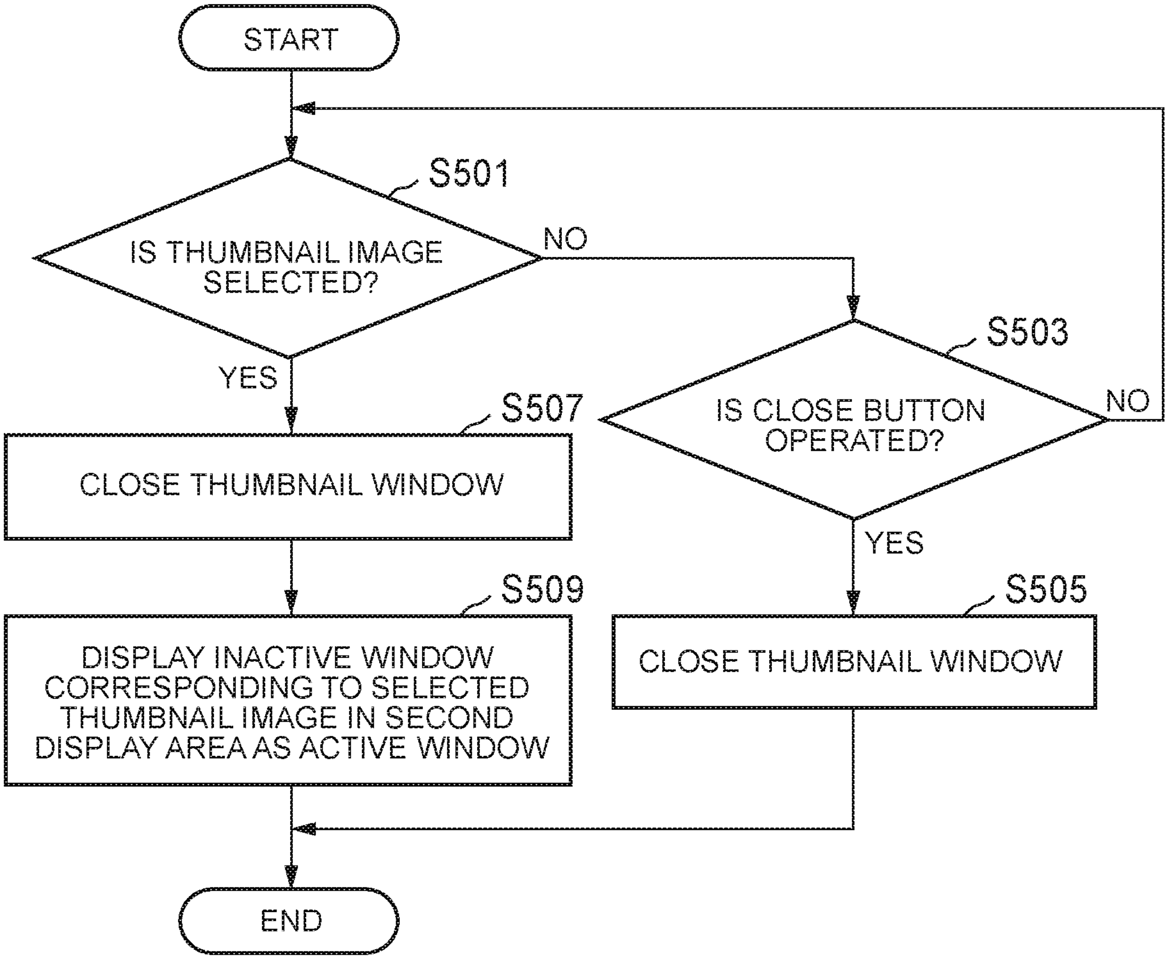
FIG. 14 is a flowchart illustrating an example of thumbnail window display control processing according to one or more embodiments.

FIG. 14 is a flowchart illustrating an example of thumbnail window display control processing according to one or more embodiments. Note that the secondary screen in the case of the two-screen mode is the second display area DA2, and the secondary screen in the case of the inverted two-screen mode is the first display area DA1.

(Step S501) The control unit 18 determines whether or not any of thumbnail images is selected. When determining that no thumbnail image is selected (NO), the control unit 18 proceeds to a process in step S503. On the other hand, when determining that any of the thumbnail images is selected (YES), the control unit 18 proceeds to a process in step S507.

(Step S503) The control unit 18 determines whether or not the close button displayed on the title bar of the thumbnail window displayed on the secondary screen is operated. When determining that the close button is operated (YES), the control unit 18 proceeds to a process in step S505. On the other hand, when that the close button is not operated (NO), the control unit 18 returns to the process in step S501.

(Step S505) When determining in step S503 that the close button is operated, the control unit 18 closes the thumbnail window and ends the processing.

(Step S507) When determining in step S501 that any one of the thumbnail images is selected, the control unit 18 closes the thumbnail window, and proceeds to a process in step S509.

(Step S509) The control unit 18 displays an inactive window corresponding to the selected thumbnail image on the secondary screen in maximized form as an active window (full-screen display).

As described above, the information processing device 10 according to one or more embodiments includes the foldable one display 150, the storage unit 13 (an example of a memory) which stores at least a program, and the control unit 18 (an example of a processor such as a CPU, a GPU, or a microcomputer included, for example, in the control unit 18) which executes the program stored in the storage unit 13. The control unit 18 executes the program stored in the storage unit 13 to perform display mode switching processing to switch among the one-screen mode (first display mode) to control display in such a manner that the screen area of the display 150 is set as one display area, the two-screen mode (second display mode) to control display in such a manner that the screen area of the display 150 is split into two display areas of the first display area DA1 and second display area DA2, and the first display area DA1 is set as the primary screen and the second display area DA2 is set as the secondary screen, and the inverted two-screen mode (third display mode) to control display in such a manner that the second display area DA2 is set as the primary screen and the first display area DA1 is set as the secondary screen. Further, when switching from the one-screen mode to the two-screen mode or the inverted two-screen mode is performed by the display mode switching processing, the control unit 18 performs display control processing to display an active window in the one-screen mode in either one of the first display area DA1 and the second display area DA2, which is a display area set as the primary screen, and to display thumbnail images corresponding to inactive windows other than the active window in the one-screen mode in the other display area of the first display area DA1 and the second display area DA2, which is set as the secondary screen. On the other hand, when switching between the two-screen mode and the inverted two-screen mode is performed by the display mode switching processing, the control unit 18 performs display control processing in which the display in the display area as the secondary screen in the display mode before switching is changed to the display in the display area as the secondary screen in the display mode after switching.

Thus, upon switching from the one-screen mode to the two-screen mode (or the inverted two-screen mode), the information processing device 10 allows the user to continue to use an app using in the one-screen mode as it is on the primary screen and to easily confirm the other running apps on the secondary screen. On the other hand, upon switching between the two-screen mode and the inverted two-screen mode, only the primary screen and the secondary screen are replaced with each other, and when a window of a selected app is already displayed on the secondary screen, the window is not switched to the thumbnail window. Therefore, the information processing device 10 is convenient for the user. Thus, the information processing device 10 can control the display on the foldable display 150 properly.

Further, in a case where switching between the two-screen mode and the inverted two-screen mode is performed by the display mode switching processing, when the thumbnail window (thumbnail images) is displayed in a display area as the secondary screen in the display mode before switching, the control unit 18 displays the thumbnail window (thumbnail images) in a display area as the secondary screen in the display mode after switching by the display control processing.

Thus, when the thumbnail window is displayed on the secondary screen upon switching between the two-screen mode and the inverted two-screen mode, since the thumbnail window is also displayed on the secondary screen after switching, only the primary screen and the secondary screen are replaced with each other before and after switching. Therefore, the information processing device 10 is convenient for the user. Thus, the information processing device 10 can control the display on the foldable display 150 properly.

Further, in a case where switching between the two-screen mode and the inverted two-screen mode is performed by the display mode switching processing, when an active window selected from the thumbnail window (thumbnail images) is displayed in a display area as the secondary screen in the display mode before switching, the control unit 18 displays the active window in a display area as the secondary screen in the display mode after switching by the display control processing.

Thus, only the primary screen and the secondary screen are replaced with each other in switching between the two-screen mode and the inverted two-screen mode, and when a window of a selected app is already displayed on the secondary screen, the window is not switched to the thumbnail window. Therefore, the information processing device 10 is convenient for the user. Thus, the information processing device 10 can control the display on the foldable display 150 properly.

Further, when switching between the two-screen mode and the inverted two-screen mode is performed by the display mode switching processing, the control unit 18 displays an active window, displayed in a display area as the primary screen in the display mode before switching, in a display area as the primary screen in the display mode after switching by the display control processing.

Thus, in switching between the two-screen mode and the inverted two-screen mode, since the information processing device 10 allows the user to continue to use an app using on the primary screen before switching as it is on the primary screen after switching, the information processing device 10 is convenient for the user. Thus, the information processing device 10 can control the display on the foldable display 150 properly.

Further, in a case where the number of running apps is two, when switching from the one-screen mode to the two-screen mode or the inverted two-screen mode is performed by the display mode switching processing, the control unit 18 may also perform control to display an active window in the one-screen mode in either one of the first display area DA1 and the second display area DA2, which is a display area set as the primary screen, and to display an inactive window other than the active window in the one-screen mode in the other display area of the first display area DA1 and the second display area DA2, which is set as the secondary screen.

Thus, even is a case where switching from the one-screen mode to the two-screen mode or the inverted two-screen mode is performed, when the number of running apps is only two, since respective windows of two running apps are displayed respectively on the primary screen and the secondary screen, rather than that the thumbnail window is displayed, the information processing device 10 is convenient for the user. There is not much meaning in displaying the thumbnail window when the number of running apps is only two because the number of thumbnail images to be displayed as choices is only one. Thus, the information processing device 10 can control the display on the foldable display 150 properly.

Further, a control method for the information processing device 10 according to one or more embodiments includes: a step of causing the control unit 18 (the example of the processor such as the CPU, the GPU, or the microcomputer included, for example, in the control unit 18) to execute a program stored in the storage unit 13 (the example of the memory) to switch among the one-screen mode (first display mode) to control display in such a manner that the screen area of the display 150 is set as one display area, the two-screen mode (second display mode) to control display in such a manner that the screen area of the display 150 is split into two display areas of the first display area DA1 and second display area DA2, and the first display area DA1 is set as the primary screen and the second display area DA2 is set as the secondary screen, and the inverted two-screen mode (third display mode) to control display in such a manner that the second display area DA2 is set as the primary screen and the first display area DA1 is set as the secondary screen; a step in which when switching from the one-screen mode to the two-screen mode or the inverted two-screen mode is performed, the control unit 18 is caused to display an active window in the one-screen mode in either one of the first display area DA1 and the second display area DA2, which is a display area as the primary screen, and to display thumbnail images corresponding to inactive windows other than the active window in the one-screen mode in the other display area of the first display area DA1 and the second display area DA2, which is set as the secondary screen; and a step in which when switching between the two-screen mode and the inverted two-screen mode is performed, the control unit 18 is caused to change the display in a display area as the secondary screen in the display mode before switching to the display in a display area as the secondary screen in the display mode after switching.

Thus, upon switching from the one-screen mode to the two-screen mode (or the inverted two-screen mode), the information processing device 10 allows the user to continue to use an app using in the one-screen mode as it is on the primary screen and to easily confirm the other running apps on the secondary screen. Further, upon switching between the two-screen mode and the inverted two-screen mode, only the primary screen and the secondary screen are replaced with each other, and when a window of a selected app is already displayed on the secondary screen, the window is not switched to the thumbnail window. Therefore, the information processing device 10 is convenient for the user. Thus, the information processing device 10 can control the display on the foldable display 150 properly.

While embodiments of this invention have been described in detail with reference to the accompanying drawings, the specific configuration is not limited to that described above, and various design changes and the like can be made without departing from the scope of this invention.

Further, in the above-described embodiments, the example in which the first display area DA1 is set to the primary screen and the second display area DA2 is set to the secondary screen by default in the two-screen mode, and the second display area DA2 is set to the primary screen and the first display area DA1 is set to the secondary screen in the inverted two-screen mode is described, but the correspondence between the primary screen and the secondary screen may be reversed. In other words, the correspondence may also be such that the second display area DA2 is set to the primary screen and the first display area DA1 is set to the secondary screen by default in the two-screen mode, and the first display area DA1 is set to the primary screen and the second display area DA2 is set to the secondary screen in the inverted two-screen mode.

Further, in the above-described embodiments, the example of the one-screen mode to control display in such a manner that the screen area of the display 150 is set as the one display area DA, and the two-screen mode to control display in such a manner that the screen area of the display 150 is split into two display areas of the first display area DA1 and the second display area DA2 are described. However, when the screen area of the display 150 is split, it is not limited to splitting the screen area into only two display areas, and it may be split into three or more display areas. For example, even in a case of a three-screen mode to control display in such a manner that the screen area of the display 150 is split into three display areas, the display orientation of each of the three display areas may also be changed according to the rotation of the display 150 without replacing pieces of display data to be displayed respectively in the three display areas.

Further, in the above-described embodiments, the examples of touch operations on one or more touch panel displays each of which is composed integrally of an input unit (touch sensor) and a display unit are described, but the operations are not limited to the touch operations, and the operations may also be click operations using a mouse, operations by gesture, and the like.

Note that the above-described control unit 18 has a computer system therein. Then, a program for implementing the function of each component included in the control unit 18 described above may be recorded on a computer-readable recording medium in such a manner that the program recorded on this recording medium is read into the computer system and executed to perform processing in each component included in the control unit 18 described above. Here, the fact that "the program recorded on the recording medium is read into the computer system and executed" includes installing the program on the computer system. It is assumed that the "computer system" here includes the OS and hardware such as a peripheral device and the like. Further, the "computer system" may also include two or more computers connected through any of networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the control unit 18, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the control unit 18 in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

DESCRIPTION OF SYMBOLS

10 information processing device
101 first chassis
102 second chassis
103 hinge mechanism
11 communication unit
12 RAM
13 storage unit
14 speaker
15 display unit
16 camera
150 display
155 touch sensor
161 first acceleration sensor
162 second acceleration sensor
17 Hall sensor
18 control unit
181 system processing unit
1811 running app information generating unit
182 detection processing unit
1821 open/close detection unit
1822 posture detection unit
1823 connection detection unit
1824 operation detection unit
183 display processing unit
1831 display mode determination unit
1832 display mode switching unit
1833 thumbnail generation unit
1834 display control unit

What is claimed is:

1. An information processing device comprising:
a foldable display;
a memory which stores at least a program; and
a processor which executes the program stored in the memory,
wherein, by executing the program stored in the memory, the processor performs display mode switching processing to switch among
a first display mode to control display in such a manner that a screen area of the display is set as one display area,
a second display mode to control display in such a manner that the screen area of the display is split into two display areas of a first display area and a second display area with the first display area set as a primary screen and the second display area set as a secondary screen, and
a third display mode to control display in such a manner that the second display area is set as the primary screen and the first display area is set as the secondary screen, and
the processor performs display control processing in which
when switching from the first display mode to the second display mode or the third display mode is performed by the display mode switching processing,
an active window in the first display mode is displayed in either one of the first display area and the second display area, which is a display area as the primary screen, such that the active window is displayed in a foreground over the entire area of the primary screen and one or more inactive windows other than the active window in the first display mode are displayed in a layer behind the foreground, and
thumbnail images corresponding to the one or more inactive windows are displayed in the other display area of the first display area and the second display area, which is set as the secondary screen, and
when switching between the second display mode and the third display mode is performed by the display mode switching processing, display in a display area as the secondary screen in the display mode before switching is changed to display in a display area as the secondary screen in the display mode after switching.

2. The information processing device according to claim 1, wherein in a case where switching between the second display mode and the third display mode is performed by the display mode switching processing, when the thumbnail images are displayed in the display area as the secondary screen in the display mode before switching, the processor displays the thumbnail images in the display area as the secondary screen in the display mode after switching by the display control processing.

3. The information processing device according to claim 1, wherein in a case where switching between the second display mode and the third display mode is performed by the display mode switching processing, when an active window selected from the thumbnail images is displayed in the display area as the secondary screen in the display mode before switching, the processor displays the active window in the display area as the secondary screen in the display mode after switching by the display control processing.

4. The information processing device according to claim 1, wherein when switching between the second display mode and the third display mode is performed by the display mode switching processing, the processor displays the active window, displayed in a display area as the primary screen in the display mode before switching, in a display area as the primary screen in the display mode after switching by the display control processing.

5. The information processing device according to claim 1, wherein in a case where the number of running apps is two, when switching from the first display mode to the second display mode or the third display mode is performed by the display mode switching processing, the processor displays the active window in the first display mode in either one of the first display area and the second display area, which is a display area as the primary screen, and an inactive window other than the active window in the first display mode in the other display area of the first display area and the second display area, which is set as the secondary screen.

6. A control method for an information processing device including: a foldable display; a memory which stores at least a program; and a processor which executes the program stored in the memory, the control method comprising, by the processor executing the program stored in the memory:

switching among a first display mode to control display in such a manner that a screen area of the display is set as one display area, a second display mode to control display in such a manner that the screen area of the display is split into two display areas of a first display area and a second display area with the first display area set as a primary screen and the second display area set as a secondary screen, and a third display mode to control display in such a manner that the second display area is set as the primary screen and the first display area is set as the secondary screen;

when switching from the first display mode to the second display mode or the third display mode is performed, an active window in the first display mode is displayed in either one of the first display area and the second display area, which is a display area as the primary screen, such that the active window is displayed in a foreground over the entire area of the primary screen and one or more inactive windows other than the active window in the first display mode are displayed in a layer behind the foreground, and thumbnail images corresponding to the one or more inactive windows are displayed in the other display area of the first display area and the second display area, which is set as the secondary screen; and when switching between the second display mode and the third display mode is performed, display in a display area as the secondary screen in the display mode before switching is changed to display in a display area as the secondary screen in the display mode after switching.

* * * * *